United States Patent
Kazmi et al.

(10) Patent No.: US 9,961,573 B2
(45) Date of Patent: May 1, 2018

(54) MEASUREMENT ON SCC SCELL AND ON/OFF DISCOVERY SIGNALS

(71) Applicant: Telefonaktiebolaget L M Ericsson (publ), Stockholm (SE)

(72) Inventors: Muhammad Kazmi, Bromma (SE); Jung-Fu Cheng, Fremont, CA (US); Sorour Falahati, Stockholm (SE); Havish Koorapaty, Saratoga, CA (US); Daniel Larsson, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 7 days.

(21) Appl. No.: 14/579,238

(22) Filed: Dec. 22, 2014

(65) Prior Publication Data

US 2015/0215799 A1   Jul. 30, 2015

Related U.S. Application Data

(60) Provisional application No. 61/933,420, filed on Jan. 30, 2014.

(51) Int. Cl.
*H04W 24/08* (2009.01)
*H04W 48/16* (2009.01)
(Continued)

(52) U.S. Cl.
CPC .......... *H04W 24/08* (2013.01); *H04W 24/10* (2013.01); *H04W 48/16* (2013.01); *H04W 48/08* (2013.01); *H04W 84/045* (2013.01)

(58) Field of Classification Search
CPC .............................. H04W 24/08; H04W 48/16
(Continued)

(56) References Cited

U.S. PATENT DOCUMENTS

2009/0156196 A1   6/2009   Somasundaram et al.
2012/0252432 A1*  10/2012  Henttonen ............ H04W 24/10
                                                    455/422.1
(Continued)

FOREIGN PATENT DOCUMENTS

WO    2011150262 A1    12/2011
WO    2013155680 A1    10/2013

OTHER PUBLICATIONS

Author Unknown, "Technical Specification Group Radio Access Network; Small cell enhancements for E-UTRA and E-UTRAN—Physical layer aspects (Release 12)," Technical Report 36.872, Version 12.0.0, 3GPP Organizational Partners, Sep. 2013, 78 pages.
(Continued)

*Primary Examiner* — Mang Yeung
*Assistant Examiner* — Peter G Solinsky
(74) *Attorney, Agent, or Firm* — Withrow & Terranova, PLLC

(57) ABSTRACT

The present disclosure relates to systems, methods, and devices for performing measurements on a carrier associated with a deactivated cell in a cellular communications system. In some embodiments, a method of operation for a wireless device for determining whether to perform one or more measurements on a carrier associated with a deactivated cell comprises acquiring at least one parameter related to a periodicity ($D_p$) of a discovery signal transmitted on one or more cells of a carrier with the deactivated cell, acquiring a measurement cycle parameter ($S_c$) for performing one or more measurements on one or more cells on the carrier, comparing the periodicity ($D_p$) of the discovery signal and the measurement cycle parameter ($S_c$), and deciding whether to perform the one or more measurements for the cells on the carrier based on the comparison of the periodicity ($D_p$) of the discovery signal and the measurement cycle parameter ($S_c$).

21 Claims, 12 Drawing Sheets

(51) Int. Cl.
*H04W 24/10* (2009.01)
*H04W 48/08* (2009.01)
*H04W 84/04* (2009.01)

(58) Field of Classification Search
USPC .......................................................... 370/252
See application file for complete search history.

(56) References Cited

U.S. PATENT DOCUMENTS

| | | | | |
|---|---|---|---|---|
| 2013/0329691 | A1* | 12/2013 | Kim ........................ | H04L 5/001 370/329 |
| 2014/0023010 | A1* | 1/2014 | Loehr ................. | H04W 52/365 370/329 |
| 2014/0029514 | A1* | 1/2014 | Yu ........................ | H04W 24/10 370/328 |
| 2014/0036817 | A1* | 2/2014 | Chang ............... | H04W 72/0446 370/329 |
| 2014/0044083 | A1* | 2/2014 | Kim ........................ | H04L 5/001 370/329 |
| 2014/0092758 | A1* | 4/2014 | Suzuki ................. | H04W 48/18 370/252 |
| 2014/0112243 | A1* | 4/2014 | Suzuki ................. | H04W 56/00 370/328 |
| 2015/0009898 | A1* | 1/2015 | Rosa ..................... | H04L 5/0048 370/328 |
| 2015/0049649 | A1* | 2/2015 | Zhu ....................... | H04L 5/0092 370/277 |
| 2015/0078192 | A1* | 3/2015 | Kim ..................... | H04L 5/0098 370/252 |
| 2015/0078466 | A1* | 3/2015 | Zhou ................... | H04W 56/004 375/260 |
| 2015/0092768 | A1* | 4/2015 | Ng ........................ | H04W 48/16 370/350 |
| 2015/0195732 | A1* | 7/2015 | Ouchi .................. | H04W 48/16 370/252 |
| 2015/0208259 | A1* | 7/2015 | Ouchi .................. | H04W 48/16 370/252 |
| 2015/0215852 | A1* | 7/2015 | Gou ...................... | H04W 48/16 455/434 |
| 2015/0223185 | A1* | 8/2015 | Harris .................. | G01S 5/0236 455/456.5 |
| 2015/0223219 | A1* | 8/2015 | Nagata ................. | H04W 48/16 455/449 |
| 2015/0236825 | A1* | 8/2015 | Park ...................... | H04L 5/0035 370/329 |
| 2015/0282036 | A1* | 10/2015 | Yi ........................... | H04L 5/001 370/332 |
| 2016/0050534 | A1* | 2/2016 | Lim ...................... | G01S 5/0236 370/252 |
| 2016/0330789 | A1* | 11/2016 | Goto .................... | H04W 48/18 |

OTHER PUBLICATIONS

"Author Unknown, ""Technical Specification LTE; Evolved Universal Terrestrial Radio Access (E-UTRA); Requirements for support of radio resource management (Release 10),"" Technical Specification 36.133, Version 10.1.0, Jan. 2011, 404 pages".

Huawei et al., "New WI proposal: Small cell enhancements—Physical layer aspects," 3GPP TSG-RAN Meeting #62, RP-132073, Busan, Korea, Dec. 3-6, 2013, 7 pages.

Ericsson, "R4-142712: Serving Cell Interruption due to Measurements without Gaps," 3rd Generation Partnership Project (3GPP), TSG-RAN WG4 Meeting #71, May 19-23, 2014, 3 pages, Seoul, South Korea.

Huawei et al., "R4-147850: Introducing requirements for small cell enhancement in TS36.133," Change Request, 3rd Generation Partnership Project (3GPP), TSG-RAN WG4 Meeting #73, Nov. 17-21, 2014, 32 pages, San Francisco, California.

Motorola Mobility, "R1-131519: Small cell discovery," 3rd Generation Partnership Project (3GPP), TSG RAN WG1 #72bis, Apr. 15-19, 2013, 2 pages, Chicago, USA.

International Search Report for International Patent Application No. PCT/IB2015/050687, dated Jun. 11, 2015, 4 pages.

International Preliminary Report on Patentability for PCT/IB2015/050687, dated Aug. 11, 2016, 12 pages.

* cited by examiner

MEASUREMENT ON SCC SCELL AND ON/OFF DISCOVERY SIGNALS

RELATED APPLICATIONS

This application claims the benefit of provisional patent application Ser. No. 61/933,420, filed Jan. 30, 2014, the disclosure of which is hereby incorporated herein by reference in its entirety.

TECHNICAL FIELD

The present disclosure relates to wireless communications, and more specifically, to managing interference between cells in wireless communications systems.

BACKGROUND

In order to meet increased traffic demands and increased data rate requirements, heterogeneous cellular communications systems are being developed and deployed. The radio access network of a conventional cellular communications network is flat, i.e., has a single layer of base stations. In contrast, the radio access network of a heterogeneous cellular communications system includes multiple layers of base stations, or radio access nodes, which typically operate at different average power levels. For instance, there may be a macro cell layer formed by a number of macro cell, or high power, base stations and a small cell layer formed by a number of small cell, or low power, base stations. Heterogeneous cellular communications systems create new interference scenarios that did not occur in the conventional cellular communications system.

In heterogeneous cellular communications systems, one of the mechanisms for interference avoidance and coordination among small cells is use of a small cell on/off feature. According to this feature, a small cell may be turned on and off, where the "on" and "off" periods may depend on criteria or an application.

In semi-static small cell on/off, the criteria for causing the small cell to transition on/off may include traffic load on the small cell, wireless device arrival to the small cell or departure from the small cell, etc. On the other hand, in dynamic small cell on/off, a small cell can be caused to turn on and off dynamically on a subframe level. The criteria in this case can be packet arrival/completion or interference coordination and avoidance (i.e., to reduce interference towards other nodes or wireless devices). Thus, the small cell turns off at the subframe boundary (or at the end of a current subframe) when the transmission of a packet is completed, and turns on at the next subframe boundary where a packet arrives. In addition, another purpose of using small cell on/off includes energy savings because, for example, the small cell is not "on" constantly.

There are three main operational modes of small cell on/off including handover, Secondary Cell (SCell) only, and serving cell operational modes. In the handover operational mode, a wireless device (e.g., a User Equipment (UE) in Third Generation Partnership Project (3GPP)) in CONNECTED mode is always attached to a cell in a cellular communications system (i.e., a network). Due to, for example, increased traffic demand, the cellular communications system may decide to offload the wireless device by handover to a small cell. If the small cell is "off," then the small cell wakes up (i.e., turns "on") to serve the wireless device. The handover time in this case depends on a backhaul delay and the handover execution time. After completion of the transmission and/or reception of data, the wireless device changes to IDLE mode or is handed over to another cell, and the small cell can be turned "off."

The SCell only mode of operation applies when a Carrier Aggregation (CA) scheme is used. CA schemes are schemes that allow a wireless device to transmit and/or receive on multiple Component Carriers (CCs). One CC is the Primary Component Carrier (PCC), where the Primary Cell (PCell) is on the PCC. A wireless device may also be configured with one or more SCells on one or more Secondary Component Carriers (SCCs).

In the SCell only operational mode of small cell on/off, a CA (also referred to as multi-carrier) capable wireless device is connected to a PCell, and the cellular communications system configures a SCell for the wireless device that can be turned on or off. If the cellular communications system decides to offload the wireless device traffic to a SCell, then the SCell is turned on. The cellular communications system may also configure more than one SCell for the wireless device, e.g., two SCells according to an on/off scheme. The PCell and SCell(s) may belong to the same frequency band or different frequency bands.

In the serving cell operational mode for small cell on/off, a small cell can be either on or off when a wireless device is connected to that small cell. The procedures for Radio Resource Management (RRM), Radio Link Monitoring (RLM), and Channel State Information (CSI) measurements must be designed for this mode.

An on/off discovery signal feature may be used in the cellular communications system. According to this feature, a small cell may be turned on and off where the "on" and "off" occasions occur periodically. During an "on" period, a network node (e.g., a base station) transmits one or more reference signals that enable a wireless device to perform measurements on the small cell controlled by the network node. During an "off" period, a network node (e.g., a base station) periodically (e.g., every 40 ms, 80 ms or 120 ms) transmits a discovery signal that enables a wireless device to discover the small cell. A discovery signal, as referred to herein, is any kind of periodic reference signal or pilot signal known to the wireless device. Examples of discovery signals include Cell-Specific Reference Signals (CRSs), CSI Reference Signals (CSI-RSs), Primary Synchronization Signals (PSSs), Secondary Synchronization Signals (SSSs), Positioning Reference Signals (PRSs), etc.

A transmission of on/off discovery signal(s) is associated with, or characterized by, one or more discovery signal parameters, e.g., a duration of each occasion when a discovery signal is transmitted, periodicity of the occurrence of the occasion of discovery signal(s), starting times of the occasions or of the pattern of the discovery signal(s), etc. One or more of the discovery signal parameters are predefined and/or signaled to the wireless device by a network node.

A wireless device may perform measurement(s) on a serving cell of the wireless device, as well as on neighboring cells, over known signals(s) (e.g., reference signals/sequences or pilot sequences). In particular, for an active cell (e.g., an activated serving cell of the wireless device or an activated neighbor cell), the wireless device performs measurement(s) on the active cell using a reference signal(s) transmitted by the active cell. For a deactivated cell (e.g., a deactivated secondary cell of the wireless device), the wireless device performs measurement(s) on the deactivated cell using a discovery signal transmitted by the deactivated cell. The measurement(s) may be performed on cells on an intra-frequency carrier, inter-frequency carrier(s), as well as on inter-Radio Access Technology (RAT) carriers(s) (depending upon the wireless device capability, e.g., whether it supports that RAT). In a multi-carrier or CA environment, a wireless device may perform measurement(s) on cells on the PCC, as well as on cells on one or more SCCs. Examples of measurements performed in Long Term Evolution (LTE) include cell identification, Reference Signal Received Power (RSRP), and Reference Signal Received Quality (RSRQ). There are other properties that can be derived from a reference signal such as, for example, Quasi Co-Location (QCL), coarse time and frequency synchronization, CSI, Reference Signal Time Difference (RSTD) measurements, fine time and frequency synchronization for demodulation purposes, etc.

The results of performing the measurement(s) by the wireless device are sometimes referred to as radio measurement(s) and are used by the wireless device for one or more radio operational tasks. Examples of such radio operational tasks include reporting the measurements to a node on a network (e.g., a cellular communications system), which in turn may use the measurements for various tasks. For example, in a Radio Resource Control (RRC) connected state, a wireless device reports radio measurements to a serving network node. In response to the reported wireless device measurements, the serving network node makes certain decisions, e.g., it may send a mobility command to the wireless device for the purpose of cell change. Cell change is an example of mobility operations that includes handover, RRC connection reestablishment, RRC connection release with redirection, PCell change in CA, PCC change in PCC, etc. In an IDLE or low activity mode or state, an example of cell change is cell reselection. In another example, a wireless device may itself use radio measurement(s) for performing tasks, e.g., cell selection, cell reselection, etc.

In multicarrier or CA operations, a wireless device is able to receive and/or transmit data to more than one serving cells. In other words, a CA capable wireless device can be configured to operate with more than one serving cell. The carrier of each serving cell is generally called a CC. In other words, the CC is an individual carrier in a multi-carrier system.

As noted above, the term carrier aggregation (CA) is interchangeable with "multi-carrier system," "multi-cell operation," "multi-carrier operation," and "multi-carrier" transmission and/or reception. This means that the CA is used for transmission of signaling and data in the uplink and downlink directions. One of the CCs is the PCC, or simply referred to as the primary carrier or anchor carrier. The remaining CCs are referred to as SCCs, or simply referred to as secondary carriers or supplementary carriers. The serving cell is interchangeably referred to as a PCell or a Primary Serving Cell (PSC). Similarly, the secondary serving cell is interchangeably referred to as a SCell or a Secondary Serving Cell (SSC).

Generally, the primary or anchor CC carries essential wireless device specific signaling. The primary CC (also referred to as PCC or PCell) exists in both uplink and downlink directions in CA. Where there is only a single uplink CC, the PCell is obviously on that CC. The cellular communications system (i.e., network) may assign different primary carriers to different wireless devices operating in the same sector or cell.

A SCell may be configured and de-configured for a wireless device. The configuration procedure is used by a serving radio network node (e.g., an enhanced or evolved Node B (eNB) in LTE) to configure a CA capable wireless device with one or more SCells (i.e., a downlink SCell, an uplink SCell, or both). On the other hand, the de-configuration procedure is used by the radio network node (e.g., an eNB) to de-configure or remove one or more already configured SCells (i.e., a downlink SCell, an uplink SCell, or both). The configuration or de-configuration procedure is also used to change the current multi-carrier configuration, e.g., for increasing or decreasing the number of SCells, or for swapping the existing SCells with other SCells or new ones. The configuration and de-configuration is performed by the eNB in LTE.

A SCell can be activated and deactivated (i.e., turned on and off, respectively). The serving radio network node (e.g., an eNB in LTE) can activate one or more deactivated SCells, or deactivate one or more SCells on corresponding configured secondary carriers. The PCell is always activated. The configured SCells are initially deactivated upon addition and after a cell change, e.g., handover. In LTE, the activation and deactivation commands are sent by an eNB via a Medium Access Control (MAC) Control Element (CE). Notably, deactivation of a SCell saves wireless device battery power.

Measurements may be performed on a SCC with a deactivated SCell. More specifically, a wireless device may perform measurements on a deactivated SCell, or other cells on the SCC with the deactivated SCell. In this case, the measurements are performed by the wireless device on one or more cells on the SCC with the deactivated SCell in accordance with a SCell measurement cycle parameter (i.e., measCycleSCell), which is configured by a protocol layer higher than a physical layer. A measurement cycle may have a periodicity of, for example, 160, 256, 320, or 512 subframes. The maximum time of a measurement within each cycle is currently not restricted by a standard, but in practice the maximum is likely to be up to six subframes in each cycle.

The current standard for LTE (i.e., 3GPP TS 36.133 Rel-10) specifies requirements for interruptions on a PCell when a wireless device performs measurements on a SCC with a deactivated SCell. For example, according to the current standard, when no Discontinuous Reception (DRX) is in use, the wireless device shall be able to identify a new detectable Frequency Division Duplexing (FDD) or Time Division Duplexing (TDD) cell on the SCC within $T_{identify\_scc}$, according to the parameter measCycleSCell, where $T_{identify\_scc}$=20 measCycleSCell.

Moreover, the measurement period for a deactivated SCell measurements is $T_{measure\_scc}$, according to the parameter measCycleSCell, where $T_{measure\_scc}$=5 measCycleSCell. According to the current standard, a wireless device shall be capable of performing RSRP and RSRQ measurements for eight identified cells on the SCC, and the wireless device physical layer shall be capable of reporting measurements to higher layers (e.g., protocol layer) with the measurement period of $T_{measure\_scc}$.

Depending on the type of information that a cellular communications system provides to a wireless device regarding reference signal(s) that the wireless device is intending to use for performing measurement(s), the wireless device adopts a measurement procedure. Under normal operation of cells, the reference signal(s) that are used for performing measurement(s) are transmitted periodically and also frequently from network node(s). For example, reference signal(s) may be transmitted in every subframe by a base station.

In existing systems, a wireless device behavior for performing measurement(s) on a carrier associated with a deactivated SCell is also determined by the conventional SCell measurement cycle parameter (i.e., measCycleSCell), which again is configured by higher layers of a cellular communications system. Thus, existing measurement procedures use the same SCell measurement cycle parameter to perform measurement(s) on both carriers associated with only activated cells and carriers associated with at least one deactivated cell. This may lead to less than desirable measurements on the deactivated cell(s). Accordingly, a need exists for a measurement procedure for performing measurement(s) on cell(s) that include a deactivated SCell.

SUMMARY

Embodiments described herein relate to performing measurements on a carrier associated with a deactivated cell in a cellular communications system. Embodiments of a method of operation for a wireless device in a cellular communications system for determining whether to perform one or more measurements on a carrier associated with a deactivated cell are disclosed. In some embodiments, the method of operation of the wireless device comprises determining whether to perform one or more measurements on a carrier associated with a deactivated cell, comprising acquiring at least one parameter related to a periodicity ($D_p$) of a discovery signal transmitted on one or more cells of a carrier with the deactivated cell, acquiring a measurement cycle parameter ($S_c$) for performing one or more measurements on one or more cells on the carrier, comparing the periodicity ($D_p$) of the discovery signal and the measurement cycle parameter ($S_c$), and deciding whether to perform the one or more measurements for the cells on the carrier based on the comparison of the periodicity ($D_p$) of the discovery signal and the measurement cycle parameter ($S_c$). In this manner, a wireless device is enabled to perform measurement(s) in a reliable and efficient manner on a carrier associated with a deactivated cell in a heterogeneous cellular communications system.

In some embodiments, the carrier is a Secondary Component Carrier (SCC) of a carrier aggregation system, and the method further comprises configuring the wireless device to operate with the SCC of the carrier aggregation system, wherein the deactivated cell is a deactivated Secondary Cell (SCell) that operates on the SCC.

In some embodiments, acquiring the measurement cycle parameter ($S_c$) comprises receiving a request from a radio access node to perform the one or more measurements on the one or more cells of the carrier of the deactivated cell, the request comprising the measurement cycle parameter ($S_c$).

In some embodiments, the method of operation of the wireless device further comprises, after deciding to perform the one or more measurements, determining an actual measurement cycle parameter ($S_{c1}$) based on the comparison of the periodicity ($D_p$) of the discovery signal and the measurement cycle parameter ($S_c$), and performing the one or more measurements in accordance with the actual measurement cycle parameter ($S_{c1}$).

In some embodiments, the method of operation of the wireless device further comprises reporting results of the performing of the one or more measurements to a node of the cellular communications network.

In some embodiments, the method of operation of the wireless device further comprises reporting the actual measurement cycle parameter ($S_{c1}$) to a node of the cellular communications network.

In some embodiments, acquiring the at least one parameter related to the periodicity ($D_p$) of the discovery signal comprises receiving the periodicity ($D_p$) of the discovery signal as a value transmitted by the cellular communications network.

In some embodiments, acquiring the at least one parameter related to the periodicity ($D_p$) of the discovery signal further comprises receiving an indication of a starting time of the periodicity ($D_p$) of the discovery signal from the cellular communications network.

In some embodiments, acquiring the at least one parameter related to the periodicity ($D_p$) of the discovery signal comprises acquiring at least one parameter having a known relationship to the periodicity ($D_p$) of the discovery signal, and deriving the periodicity ($D_p$) of the discovery signal from the at least one parameter.

In some embodiments, the method of operation of the wireless device further comprises deriving the starting time for the periodicity ($D_p$) of the discovery signal from the at least one parameter.

In some embodiments, the at least one parameter is one of a group consisting of a bandwidth of the carrier, a number of subframes within a discovery signal occasion, and an identifier associated with a discovery signal.

In some embodiments, deciding whether to perform the one or more measurements on the one or more cells of the carrier based on the comparison of the periodicity ($D_p$) of the discovery signal and the measurement cycle parameter ($S_c$) comprises deciding to perform the one or more measurements only when at least one occasion of the discovery signal is time-aligned with at least one occasion of the measurement cycle parameter ($S_c$) as determined based on the starting time of the periodicity ($D_p$) of the discovery signal and the measurement cycle parameter ($S_c$).

In some embodiments, determining the actual measurement cycle parameter ($S_{c1}$) comprises setting the actual measurement cycle parameter ($S_{c1}$) to a maximum of the periodicity ($D_p$) of the discovery signal and the measurement cycle parameter ($S_c$).

In some embodiments, the method of operation of the wireless device further comprises performing the one or more measurements in accordance with the actual measurement cycle parameter ($S_{c1}$) over a predefined time period corresponding to the measurement cycle parameter ($S_c$) multiplied by a scaling factor (m).

In some embodiments, determining the actual measurement cycle parameter ($S_{c1}$) comprises setting the actual measurement cycle parameter ($S_{c1}$) to the measurement cycle parameter ($S_c$) multiplied by an integer (k) greater than or equal to 1, when the measurement cycle parameter ($S_c$) is greater than or equal to the periodicity ($D_p$) of the discovery signal.

In some embodiments, the actual measurement cycle parameter ($S_{c1}$) further comprises setting the actual measurement cycle parameter ($S_{c1}$) to the periodicity ($D_p$) of the discovery signal multiplied by an integer (k) greater than or equal to 1, when the measurement cycle parameter ($S_c$) is less than the periodicity ($D_p$) of the discovery signal.

In some embodiments, performing the one or more measurements in accordance with the actual measurement cycle parameter ($S_{c1}$) comprises performing the one or more measurements in accordance with the actual measurement cycle parameter ($S_{c1}$) over a predefined time period corresponding to the measurement cycle parameter ($S_c$) multiplied by a scaling factor (m).

In some embodiments, the discovery signal is a first reference signal for a carrier associated with a deactivated cell, and the periodicity ($D_p$) of the discovery signal is less than a periodicity of a second reference signal for the cell in an activated state.

In some embodiments, the discovery signal comprises at least one of a Cell-Specific Reference Signal (CRS) a Channel State Information Reference Signal (CSI-RS), a Primary Synchronization Signal (PSS), a Secondary Synchronization Signal (SSS), and a Positioning Reference Signal (PRS).

In some embodiments, the carrier is one of an intra-frequency carrier, an inter-frequency carrier, and an inter-Radio Access Technology (RAT) carrier.

In some embodiments, the one or more measurements comprise at least one of a group consisting of Radio Resource Management (RRM) measurements, Radio Link Monitoring (RLM) related measurements, Quasi Co-Location (QCL) of transmitting nodes, Reference Signal Time Difference (RSTD), Channel State Information (CSI), and time and frequency synchronization among transmissions of reference signals.

Embodiments of a wireless device in a cellular communications system operable for determining whether to perform one or more measurements on one or more cells on a carrier associated with a deactivated cell that operates on a component carrier are also disclosed. In some embodiments, the wireless device comprises a transceiver module, a processing module, and a memory module storing software executable by the processing module, whereby the wireless device is operative to acquire at least one parameter related to a periodicity ($D_p$) of a discovery signal of the deactivated cell on a carrier, acquire a measurement cycle parameter ($S_c$) for one or more measurements for one or more cells on the carrier, compare the periodicity ($D_p$) of the discovery signal and the measurement cycle parameter ($S_c$), and decide whether to perform the one or more measurements for the one or more cells on the carrier based on the comparison of the periodicity ($D_p$) of the discovery signal and the measurement cycle parameter ($S_c$).

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
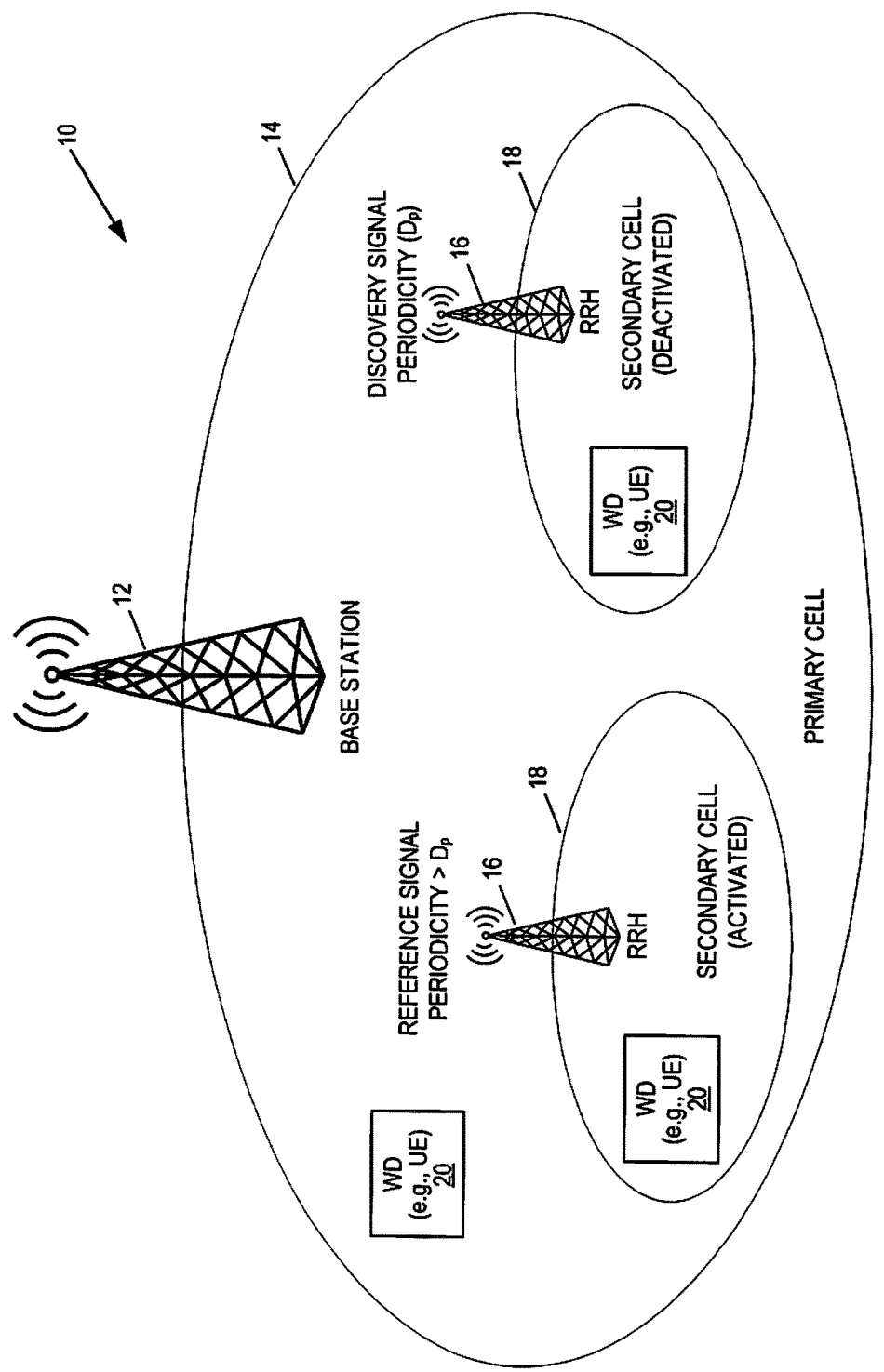
FIG. 1 illustrates a cellular communications system in which a wireless device performs measurements on a carrier associated with a deactivated cell according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

In the following description, numerous specific details are set forth. However, it is understood that embodiments of the present disclosure may be practiced without these specific details. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "some embodiments," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

As used herein, an electronic device (e.g., an end station, a network device, etc.) may store and transmit (e.g., internally and/or with other electronic devices over a network) code (composed of software instructions) and data using machine-readable media, such as non-transitory machine-readable media (e.g., machine-readable storage media such as magnetic disks, optical disks, Read Only Memory (ROM), flash memory devices, phase change memory) and transitory machine-readable transmission media (e.g., electrical, optical, acoustical, or other forms of propagated signals—such as carrier waves, infrared signals). In addition, such electronic devices include hardware such as a set of one or more processors coupled to one or more other components, such as one or more non-transitory machine-readable media to store code and/or data, user input/output devices (e.g., a keyboard, a touchscreen, and/or a display), and network connections to transmit code and/or data using propagating signals. The coupling of the set of processors and other components is typically through one or more busses and bridges (also referred to as bus controllers). Thus, a non-transitory machine-readable medium of a given electronic device typically stores instructions for execution on one or more processors of that electronic device. One or more parts of an embodiment of the present disclosure may be implemented using different combinations of software, firmware, and/or hardware.

As used herein, a network device or apparatus (e.g., a router, switch, or bridge) is an electronic device that may include at least a piece of networking equipment, including hardware and software, which communicatively interconnects other equipment on the network (e.g., other network devices, end stations, etc.). Some network devices are "multiple services network devices" that provide support for multiple networking functions (e.g., routing, bridging, switching, Layer 2 aggregation, session border control, Quality of Service (QoS), and/or subscriber management), and/or provide support for multiple application services (e.g., data, voice, and video).

As used herein, subscriber end stations (e.g., servers, workstations, laptops, netbooks, palm tops, mobile phones, smartphones, multimedia phones, Voice Over Internet Protocol (VOIP) phones, User Equipment (UE), terminals, portable media players, Global Positioning System (GPS) units, gaming systems, and set-top boxes) may comprise an electronic device that can access content/services provided over the Internet and/or content/services provided on Virtual Private Networks (VPNs) overlaid on (e.g., tunneled through) the Internet. The content and/or services are typically provided by one or more end stations (e.g., server end stations) belonging to a service or content provider or end stations participating in a Peer-to-Peer (P2P) service, and may include, for example, public webpages (e.g., free content, store fronts, and search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations). One of ordinary skill in the art would realize that any network device, end station, or other network apparatus can perform the functions described herein.

As used herein, a more general term "network node" is used, and it can correspond to any type of radio network node or any network node which may communicate with a wireless device (e.g., a UE) and/or with another network node. The network node may be a network device or apparatus. Examples of network nodes are a Node B, a base station, a Multi-standard Radio (MSR) radio node such as a MSR base station, an enhanced or evolved Node B (eNB), network controller, radio network controller (RNC), base station controller (BSC), a relay, a donor node controlling relay, a Base Transceiver Station (BTS), an access point, transmission points, transmission nodes, a Remote Radio Unit (RRU), a Remote Radio Head (RRH), nodes in a Distributed Antenna System (DAS), a core network node (e.g., a Mobile Switching Centre (MSC), a Mobility Management Entity (MME), etc.), an Operation and Management (O&M), an Operations Support System (OSS), a Self Organizing Network (SON), a positioning node (e.g., an Evolved Serving Mobile Location Centre (E-SMLC)), a Minimization of Drive Tests (MDT), etc.

As used herein, the non-limiting term wireless device (e.g., a user equipment device (UE)) in Third Generation Partnership Project (3GPP) terminology) is used and refers to any type of electronic device that can communicate wirelessly with a network node and/or with another wireless device in a cellular or mobile communications system or network. Examples of a wireless device include a target device, a Device-to-Device (D2D) wireless device, a machine-type wireless device, or a wireless device capable of Machine-to-Machine (M2M) communication, a Personal Digital Assistant (PDA), an iPad, a tablet, mobile terminals, a smart phone, Laptop Embedded Equipment (LEE), Laptop Mounted Equipment (LME), Universal Serial Bus (USB) dongles, etc.

It should be understood that although terminology from 3GPP Long-Term Evolution (LTE) has been used in this disclosure to exemplify the embodiments described herein, this should not be seen as limiting the scope of the disclosure to only the aforementioned system. Other wireless systems within the scope of this disclosure include, for example, Wideband Code Division Multiple Access (WCDMA), High Speed Packet Access (HSPA), WiMax, WiFi, Wireless Local Area Network (WLAN), and Global System for Mobile Communications (GSM), GSM Enhanced Data Rates for Global Evolution (EDGE) Radio Access Network (GERAN), and other systems that may also benefit from exploiting the scope of this disclosure.

It should be understood that terminology such as network node (e.g., eNB) and wireless device (e.g., user equipment device (UE)) should be considered as non-limiting and does not, in particular, imply a certain hierarchical relationship between the two. In general, a network node could be considered as a first device and a wireless device as a second device, and these two devices may communicate with each other over some radio channel.

Although embodiments described herein are applicable to single carrier operations of a wireless device, the embodiments are also applicable for multi-carrier or Carrier Aggregation (CA) operations of wireless devices. Therefore, the embodied methods of signaling information to wireless devices, to network nodes, or to other types of nodes can be carried out independently for each cell, on each carrier frequency supported by a respective network node.

It should be further understood that the disclosed embodiments are not mutually exclusive. Components from one embodiment may be tacitly assumed to be present in another embodiment and it would be obvious to a person skilled in the art how those components may be used in the other exemplary embodiments.

Systems and methods are disclosed herein for enabling, or at least improving, cellular operations and services in a cellular communications system. Notably, the disclosed embodiments may be combined with each other in any way. Before describing embodiments of the present disclosure, a discussion of problems associated with the conventional system is beneficial.

In a conventional cellular communications system, depending on the type of information that the cellular communications system provides for a wireless device regarding a reference signal that the wireless device is to use for performing measurements on a secondary component carrier, the wireless device adopts a measurement procedure. Under normal operation of cells on the Secondary Component Carrier (SCC), the reference signals that are used for the measurements on the cells on the SCC are transmitted periodically and also frequently from the radio network node(s) controlling the cells (e.g., in every subframe). Hence, the behavior of the wireless device for performing measurements on a deactivated Secondary Cell (SCell) can be determined using a SCell measurement cycle (i.e., measCycleSCell), which is configured by higher layers.

In small cell on/off schemes, the measurements performed by the wireless device on a deactivated small cell are based on a discovery transmitted by the corresponding radio network node. This discovery signal has a different periodicity and occurs less frequently than the reference signals used for performing measurements on an activated cell. Since, conventionally, the measurements on both activated and deactivated cells are performed using the SCell measurement cycle, the number of occurrences of the discovery signal of a deactivated cell during the SCell measurement cycle is typically less than the number of occurrences of the reference signal(s) of an activated cell during the same SCell measurement cycle. Hence, there may not be enough occurrences of the discovery signal of a deactivated cell during the SCell measurement cycle to fully assist the wireless device in performing the measurements) on the deactivated cell efficiently.

In other words, existing measurement procedures are only based on using a conventional SCell measurement cycle parameter, which may not be sufficient for performing reliable and efficient measurements on discovery signal(s) transmitted by deactivated SCells. Therefore, for a wireless device to perform an efficient measurement procedure, this disclosure describes solutions to ensure that a wireless device can adopt a procedure for performing measurement(s) based on information that is provided by a cellular communications system 10 about reference signal(s) (e.g., discovery signals) to be used for the measurement(s).

Another problem in existing systems that is solved by at least some embodiments of the present disclosure is that, in normal operations of cells, reference signal(s) that are used for measurements by using the SCell measurement cycle are intended to provide Radio Resource Management (RRM) measurements. However, the situation with using discovery signals related to a deactivated cell can be different. For example, one purpose of using discovery signals is for performing the RRM measurements as in the normal operation. However, in some embodiments, depending on a structure of a discovery signal, a wireless device may be able to derive other properties, such as Quasi Co-Location (QCL), enhanced time and frequency synchronization for demodulation purposes, and Channel State Information (CSI) from the discovery signal as well. Therefore, at least some embodiments of the present disclosure provide efficient solutions to a need that exists so that a wireless device can obtain or derive a complete or a selection of one or more properties that a discovery signal can provide.

FIG. 1 illustrates an example of a cellular communications system 10 in which measurements are performed on a carrier associated with a deactivated cell according to some embodiments of the present disclosure. The cellular communications system 10 is also referred to herein as the cellular communications network 10, or the network 10. As illustrated, the cellular communications system 10 includes a base station 12, which may also be referred to as, in 3GPP LTE terminology, an eNB. The base station 12 controls, or serves, a Primary Cell (PCell) 14 for carrier aggregation. The cellular communications system 10 also includes a number of Remote Radio Heads (RRHs) 16 that operate to control, or serve, corresponding SCells 18. A number of wireless devices 20 are served by the base station 12 and, in some cases, the RRHs 16 according to a carrier aggregation scheme. The base station 12 and the RRHs 16 may more generally be referred to herein as radio network nodes, or access nodes, and even more generally as network nodes. The cellular communications system 10 of FIG. 1 is only an example. For instance, in another example, the PCell 14 and the SCells 18 are all controlled, or served, by the same base station 12.

The SCells 18 may be activated or deactivated according to any desired activation/deactivation (i.e., on/off) scheme. In the illustrated example, one of the SCells 18 is deactivated and the other SCell 18 is activated. The SCells 18 may or may not be on the same SCC. The RRHs 16 controlling the SCells 18 transmit one or more reference signals that have predetermined or predefined periodicities. A reference signal (i.e., a discovery signal) that is transmitted by the deactivated SCell 18 may have a different periodicity than a reference signal transmitted by the activated SCell 18. For example, the occurrences of transmitting reference signals by the RRH 16 may be more frequent when the corresponding SCell 18 is activated, compared to the frequency of occurrences of transmitting discovery signals by the same RRH 16 when the corresponding SCell 18 is deactivated. As noted above, a reference signal transmitted by a deactivated cell may be referred to as a discovery signal, which has a periodicity denoted by $D_p$.

In some embodiments, a wireless device 20 may be configured and requested to measure on one or more cells on a SCC of the deactivated SCell 18. As such, the wireless device 20 is signaled by a higher layer, and the signaling includes a SCell measurement cycle ($S_c$). In other words, a SCell measurement cycle ($S_c$) parameter is signaled by a higher layer to the wireless device 20 to perform one or more measurements on the SCC in accordance with the SCell measurement cycle ($S_c$). This could, for example, be the case when the wireless device 20 is configured with at least one deactivated SCell (e.g., the deactivated SCell 18) on the SCC in the cellular communications system 10. However, in the case where the network (e.g., the RRH 16 controlling the deactivated SCell 18) is transmitting one or more discovery signals to the wireless device 20 for the deactivated SCell 18, the discovery signal(s) should be used for measurement purposes.

The wireless device 20 may acquire an occasion of an occurrence of discovery signal(s) for the deactivated SCell 18. The periodicity of the periodicity ($D_p$) of the discovery signal may be such that the wireless device 20 does not necessarily receive the discovery signal to coincide with the SCell measurement cycle ($S_c$). In some embodiments, systems and methods of the present disclosure enable the wireless device 20 to determine an actual measurement cycle ($S_{c1}$) using a well-defined procedure such that the wireless device 20 can perform measurements on the deactivated SCell 18 using the discovery signal(s) and the determined (actual) measurement cycle ($S_{c1}$). In accordance with these procedures, the wireless device 20 can utilize the information that is provided to it to perform one or more measurements.

In this context, systems and methods are disclosed herein that enable nodes, such as the wireless device 20, in the cellular communications system 10 to determine whether to perform one or more measurements on a carrier associated with a deactivated cell (e.g., a deactivated SCell), when advantageous, desired, or necessary. In some embodiments, a node (e.g., the wireless device 20) decides whether to perform one or more measurements for cells on a carrier associated with a deactivated cell based on a comparison of a periodicity ($D_p$) of the discovery signal transmitted by the deactivated cell and the SCell measurement cycle ($S_c$). This improves interference avoidance and coordination among small cells.

Exemplary embodiments include methods of operation in the wireless device 20 and the cellular communications system 10 to obtain a measurement cycle with knowledge of a periodicity ($D_p$) of a discovery signal, and methods in the wireless device 20 and the cellular communications system 10 to obtain the measurement cycle without knowledge of the periodicity ($D_p$) of the discovery signal.

Other embodiments of the disclosure described herein are related to properties that discovery signal(s) can provide. Depending on a design of the discovery signal(s), a discovery signal can be associated with different Identifiers (IDs) where an ID is coupled to a set of properties that a discovery signal can provide. Examples of the properties include RRM measurements, Radio Link Monitoring (RLM) related measurements, coarse time and frequency synchronization, QCL, Reference Signal Time Difference (RSTD), CSI, time and frequency synchronization for demodulation purposes, etc. Depending on use cases, nodes of the cellular communications system 10 can configure the wireless device 20 with a specific discovery signal ID, with a couple IDs, or with a group of IDs that can deliver the properties that the wireless device 20 acquires for a considered application.

In this regard, embodiments are directed to methods of operation for the wireless device 20 and the cellular communications system 10 to indicate a discovery signal ID, and to derive different properties (e.g., a periodicity ($D_p$) of a discovery signal) from the discovery signal associated with the ID. Disclosed embodiments are also directed to methods of operation for the wireless device 20 and the cellular communications system 10 to obtain a measurement cycle with knowledge of the periodicity ($D_p$) of the discovery signal.

In some embodiments, the wireless device 20 is configured and is requested to measure on one or more cells on a SCC (e.g., both of the SCells 18 of FIG. 1 in a scenario where both of the SCells 18 are on the same SCC). The wireless device 20 is signaled by a higher layer, where the signaling includes a SCell measurement cycle parameter ($S_c$). The obtained SCell measurement cycle parameter ($S_c$) may be used by the wireless device 20 for performing one or more measurements on one or more of the SCells 18 (e.g., a configured SCell 18 and neighboring cells) on the SCC. This could, for example, be the case when the wireless device 20 is configured with at least one deactivated SCell 18 on the SCC. These embodiments are also applicable when the wireless device 20 is configured with more than one SCC, e.g., a first SCC and a second SCC.

The radio access node (e.g., the RRH 16) controlling the deactivated SCell 18 may transmit one or more discovery signal(s) and may also signal information related to the discovery signal(s) to wireless device 20, e.g., the periodicity ($D_p$) of the discovery signal. That is, the periodicity ($D_p$) of the discovery signal with which the radio access node transmits the discovery signal(s), e.g., in one or more subframes once every 160 milliseconds (ms) (e.g., $D_p$=160 ms). In some embodiments, the information signaled to the wireless device 20 may be implicit (e.g., derived from another parameter, e.g., linked to the bandwidth or number of subframes of discovery signals), or explicit (e.g., exact periodicity ($D_p$) of the discovery signal such as 160 ms).

In some embodiments, the wireless device 20 adopts a comparison rule based on the SCell measurement cycle parameter ($S_c$) and the periodicity ($D_p$) of the discovery signal, where the outcome of that rule is used to decide whether to perform measurement(s) and/or how to tune an actual measurement cycle parameter ($S_{c1}$) to be used to perform measurement(s) on the deactivated SCell 18 based on the SCell measurement cycle parameter ($S_c$) and the periodicity ($D_p$) of the discovery signal.

Figure 2:
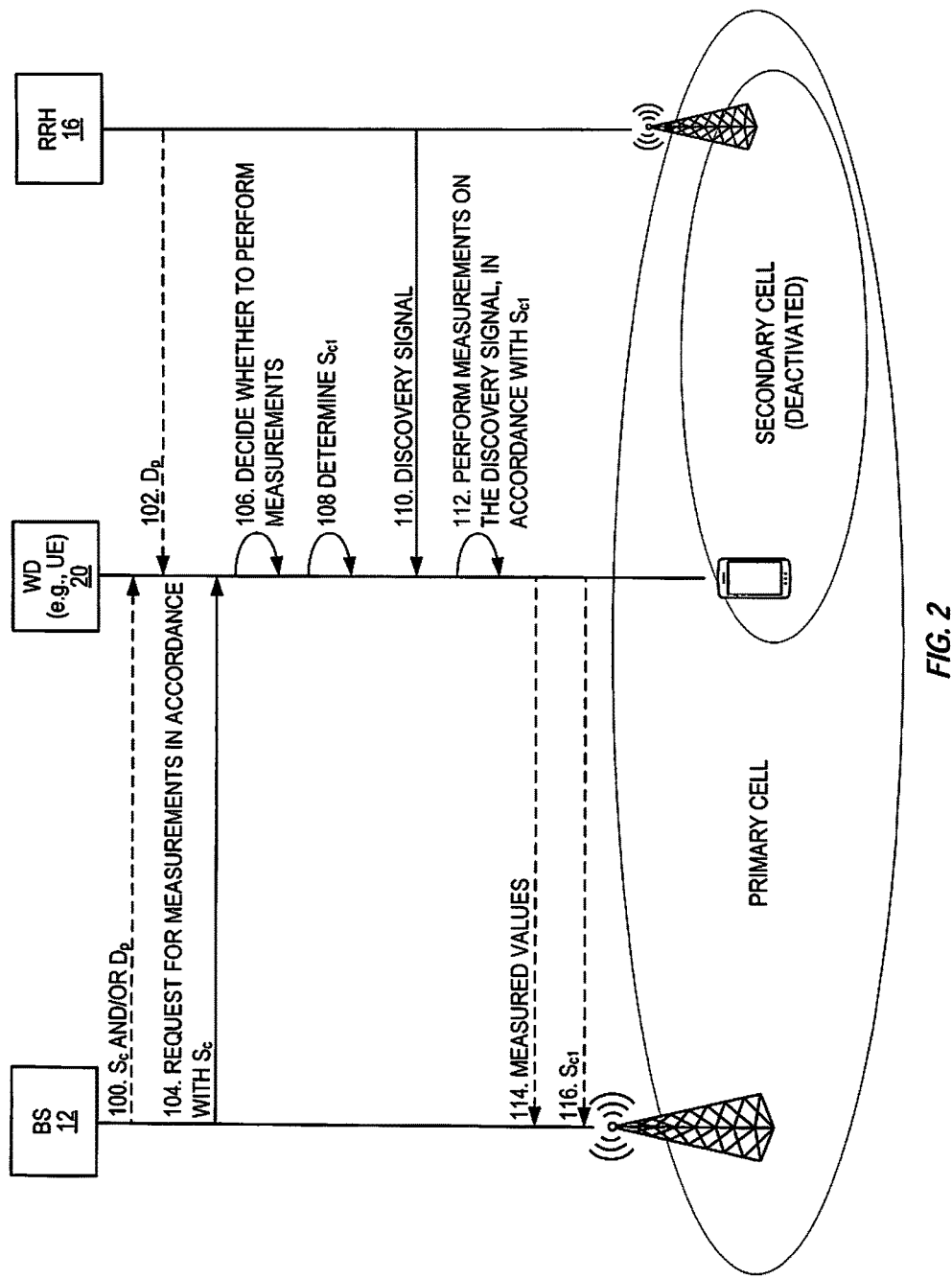
FIG. 2 is a communication flow diagram that illustrates the operation of the cellular communications system of FIG. 1 to enable the wireless device to determine whether to perform one or more measurements on a carrier associated with a deactivated cell according to some embodiments of the present disclosure.

FIG. 2 is a communication flow diagram that illustrates the operation of the cellular communications system 10 of FIG. 1 to enable the wireless device 20 to determine whether to perform one or more measurements on a carrier associated with a deactivated cell according to some embodiments of the present disclosure. In this example, the carrier is the secondary carrier, and the deactivated cell is the deactivated SCell 18. Note that, while the base station 12 controlling the PCell 14 and the RRH 16 controlling the deactivated SCell 18 are illustrated as being separate radio network nodes in this example, the PCell 14 and the deactivated SCell 18 may alternatively be controlled by the same radio network node (i.e., the base station 12). Note that the steps described below with respect to FIG. 2 (as well as any other of the figures described herein) are not limited to being performed in any particular order. The steps may be performed in any suitable order unless explicitly or implicitly required.

First, the wireless device 20 may optionally acquire parameter(s) related to a periodicity ($D_p$) for discovery signals transmitted on the deactivated SCell 18 and a SCell measurement cycle parameter ($S_c$). More specifically, in some embodiments, the wireless device 20 obtains the SCell measurement cycle parameter ($S_c$) and the periodicity ($D_p$) of the discovery signals from the base station 12 (step 100). In other embodiments, the wireless device 20 receives the SCell measurement cycle parameter ($S_c$) from the base station 12 (step 100) and the periodicity ($D_p$) of the discovery signals from the RRH 16 controlling the deactivated SCell 18 (step 102). In steps 100 and 102, the SCell measurement cycle parameter ($S_c$) and the periodicity ($D_p$) of the discovery signals are obtained via, e.g., higher layer signaling. However, the present disclosure is not limited thereto.

The wireless device 20 receives from the base station 12 a request to perform one or more measurements in accordance with the SCell measurement cycle parameter ($S_c$) on cell(s) on the SCC associated with the deactivated SCell 18 (step 104). Notably, in some embodiments, the SCell measurement cycle parameter ($S_c$) may be included in the request of step 104 and, therefore, obtained by the wireless device 20 as part of the request. The wireless device 20 then decides whether to perform the measurement(s) for the cell(s) on the SCC based on a comparison of the periodicity ($D_p$) of the discovery signals and the SCell measurement cycle parameter ($S_c$) (step 106). Details of some embodiments of this comparison are described below. If the wireless device 20 decides to perform the measurement(s), then the wireless device 20 determines an actual measurement cycle parameter ($S_{c1}$) to use to perform the measurement(s) on the cell(s), including the deactivated SCell 18, on the SCC (step 108). The wireless device 20 then performs the measurement(s) on the deactivated SCell 18 using the discovery signal(s) received from the deactivated SCell 18 in accordance with the actual measurement cycle parameter ($S_{c1}$) (steps 110 and 112). Lastly, the wireless device 20 may optionally transmit information (e.g., measured values) obtained by performing the measurement(s) to the base station 12 that requested the measurement(s), or to any another node of the cellular communications system 10 (step 114). Optionally, the wireless device 20 may transmit the actual measurement cycle parameter ($S_{c1}$) used for performing the measurement(s) to the base station 12 (step 116).

Figure 3:
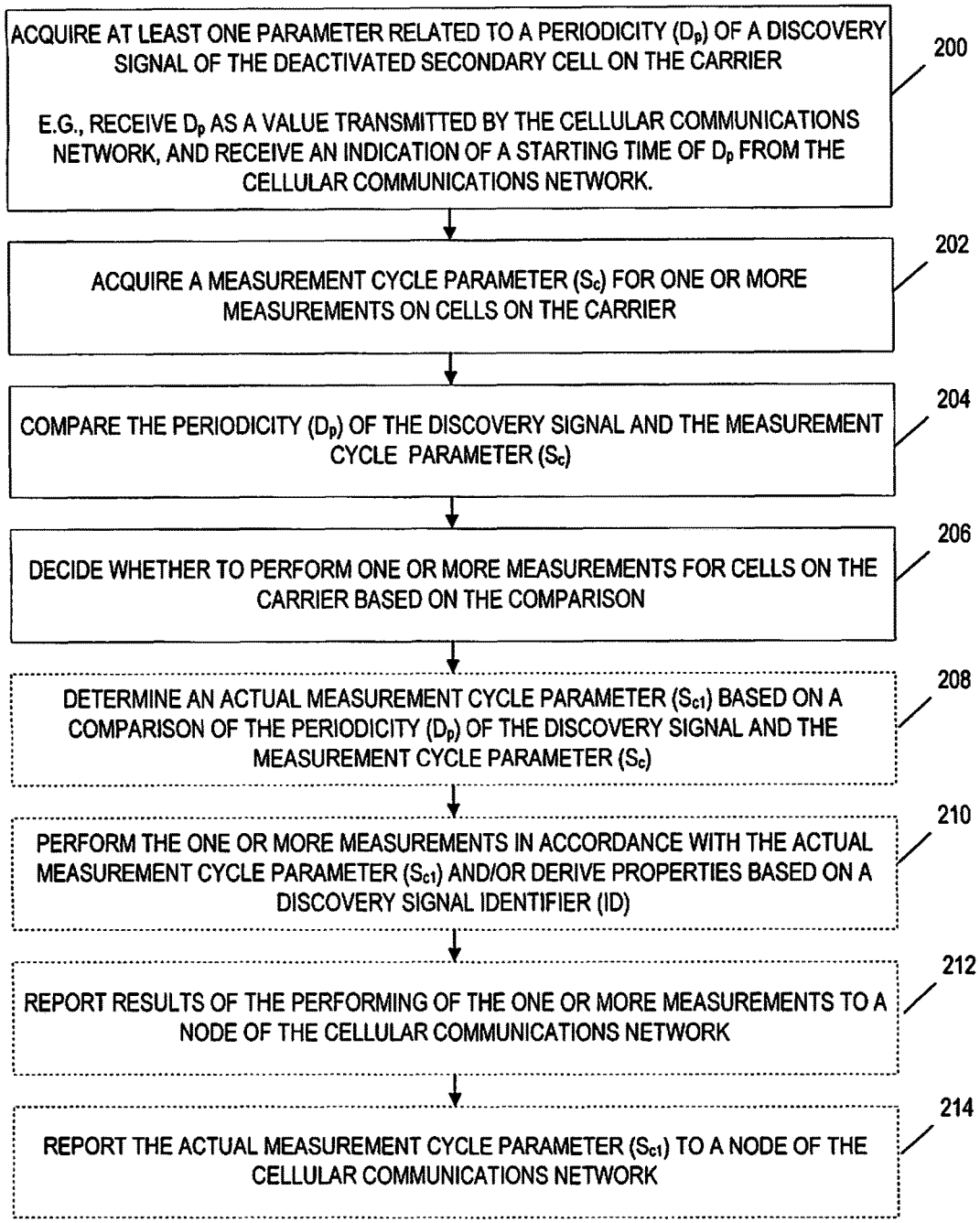
FIG. 3 is a flow chart that illustrates a process for determining whether to perform one or more measurements on a carrier associated with a deactivated cell based on received parameters according to some embodiments of the present disclosure.

FIG. 3 is a flow chart that illustrates the operation of the wireless device 20 to determine whether to perform one or more measurements on a carrier associated with a deactivated cell, based on a comparison of a periodicity ($D_p$) of a discovery signal and a measurement cycle parameter ($S_c$) according to some embodiments of the present disclosure. This process is a more detailed embodiment of the process of FIG. 2 from the perspective of the wireless device 20. Again, in this example, the carrier is the SCC, and the deactivated cell is the deactivated SCell 18; however, the present disclosure is not limited thereto.

As illustrated in FIG. 3, the wireless device 20 acquires at least one parameter related to a periodicity ($D_p$) of a discovery signal of the deactivated SCell 18 on the SCC (step 200). In some embodiments, the at least one parameter related to the periodicity ($D_p$) of the discovery signal includes a value indicative of the periodicity ($D_p$) of the discovery signal (i.e., a value corresponding to the periodicity ($D_p$) of the discovery signal) and, in some embodiments, a starting time for the periodicity ($D_p$) of the discovery signal. In some embodiments, the wireless device 20 receives the at least one parameter related to the periodicity ($D_p$) of the discovery signal of the deactivated SCell 18 via a transmission(s) (e.g., signaling) from the cellular communications network (e.g., by the base station 12).

As discussed above, while the parameter(s) related to the periodicity ($D_p$) of the discovery signal may be obtained, or acquired, in any suitable manner, in some embodiments, the parameter(s) are obtained via higher layer signaling (e.g., signaling above the physical layer). This signaling may be from the RRH 16 (or other radio access node) controlling the deactivated SCell 18, but is not limited thereto. As discussed below, in other embodiments, the parameter(s) related to the periodicity ($D_p$) of the discovery signal may be acquired by the wireless device 20 by determining the parameter(s) related to the periodicity ($D_p$) of the discovery signal based on a known or predefined relationship between the parameter(s) related to the periodicity ($D_p$) of the discovery signal and some other parameter(s) that is known to or otherwise obtained by the wireless device 20.

The wireless device 20 also acquires a measurement cycle parameter ($S_c$) to perform one or more measurements on cell(s) on the SCC (step 202). The measurement cycle parameter ($S_c$) is, in some embodiments, signaled or otherwise transmitted to the wireless device 20 from the network (e.g., from the base station 12). In some embodiments, the wireless device 20 receives a request from a radio access node (e.g., the base station 12) to perform measurement(s) on the SCC of the deactivated SCell 18, wherein the request may include the SCell measurement cycle parameter ($S_c$). The wireless device 20 then compares the periodicity ($D_p$) of the discovery signal and the SCell measurement cycle parameter ($S_c$) (step 204). Based on the comparison, the wireless device 20 decides whether to perform measurement(s) for cell(s) on the SCC associated with the deactivated SCell 18 (step 206).

While not essential, the process may further include one or more of the following steps. In some embodiments, the wireless device 20 determines an actual measurement cycle parameter ($S_{c1}$) to be used for performing measurements on the cell(s), including the deactivated SCell 18, on the SCC based on the comparison of the periodicity ($D_p$) of the discovery signal and the SCell measurement cycle parameter ($S_c$) (step 208). In some embodiments, the wireless device 20 then performs measurement(s) on the cell(s), including the deactivated SCell 18, on the SCC in accordance with the actual measurement cycle parameter ($S_{c1}$) (step 210). In some embodiments, the wireless device 20 may acquire additional properties of or about the discovery signal based on an ID associated with the discovery signal, where the ID is known or could be determined by the wireless device 20 (step 210). For example, the ID of the discovery signal may be obtained by detecting the discovery signal, where detecting the discovery signal directly or indirectly identifies some characteristic of the discovery signal that has a predefined relationship to the ID of the discovery signal. The wireless device 20 may then, in some embodiments, report information resulting from the performing of the measurement(s) to a node (e.g., the base station 12) of the cellular communications system 10 (step 212). Lastly, the wireless device 20 may, in some embodiments, report the actual measurement cycle parameter ($S_{c1}$) to a node (e.g., the base station 12) of cellular communications system 10 (step 214).

As described above, the decision as to whether the wireless device 20 performs measurement(s) on the cell(s) on the SCC associated with the deactivated SCell 18 and, if so, the decision as to what the actual measurement cycle parameter ($S_{c1}$) is used for performing the measurement(s) may be based on the output of a comparison of the periodicity ($D_p$) of the discovery signal and the SCell measurement cycle parameter ($S_c$). More specifically, the decision as to whether the wireless device 20 performs the measurement(s) on the cell(s) on the SCC associated with the deactivated SCell 18 and, if so, the decision as to what the actual measurement cycle parameter ($S_{c1}$) is used for performing the measurement(s) may be based on one or more generalized functions for comparison, as detailed below. In this regard, examples of generalized functions for performing the comparison to determine the actual measurement cycle parameter ($S_{c1}$) are given below.

As a threshold determination, if the SCell measurement cycle ($S_c$) and the periodicity ($D_p$) of the discovery signal can be aligned (e.g., time-aligned), then wireless device 20 can perform measurement(s) on the cell(s), including the deactivated SCell 18, on the SCC in accordance with a value determined for the actual measurement cycle parameter ($S_{c1}$). If the SCell measurement cycle ($S_c$) and the periodicity ($D_p$) of the discovery signal cannot be aligned, then the wireless device 20 may decide not to perform measurement(s) on the cell(s) on the SCC associated with the deactivated SCell 18 (or at least to one perform measurement(s) on the deactivated SCell 18).

In some embodiments, the actual measurement cycle parameter ($S_{c1}$) is a function of the SCell measurement cycle ($S_c$) and the periodicity ($D_p$) of the discovery signal. In other words, $S_{c1}=f(S_c, D_p)$, where $S_{c1}$ is the actual SCell measurement cycle to be used by wireless device 20 for performing measurement(s) on cell(s) on the SCC with the deactivated SCell 18. The function f( ) is any suitable function, examples of which are described below. Specific examples of comparison rules that the wireless device 20 can apply are also given below.

Figure 4:
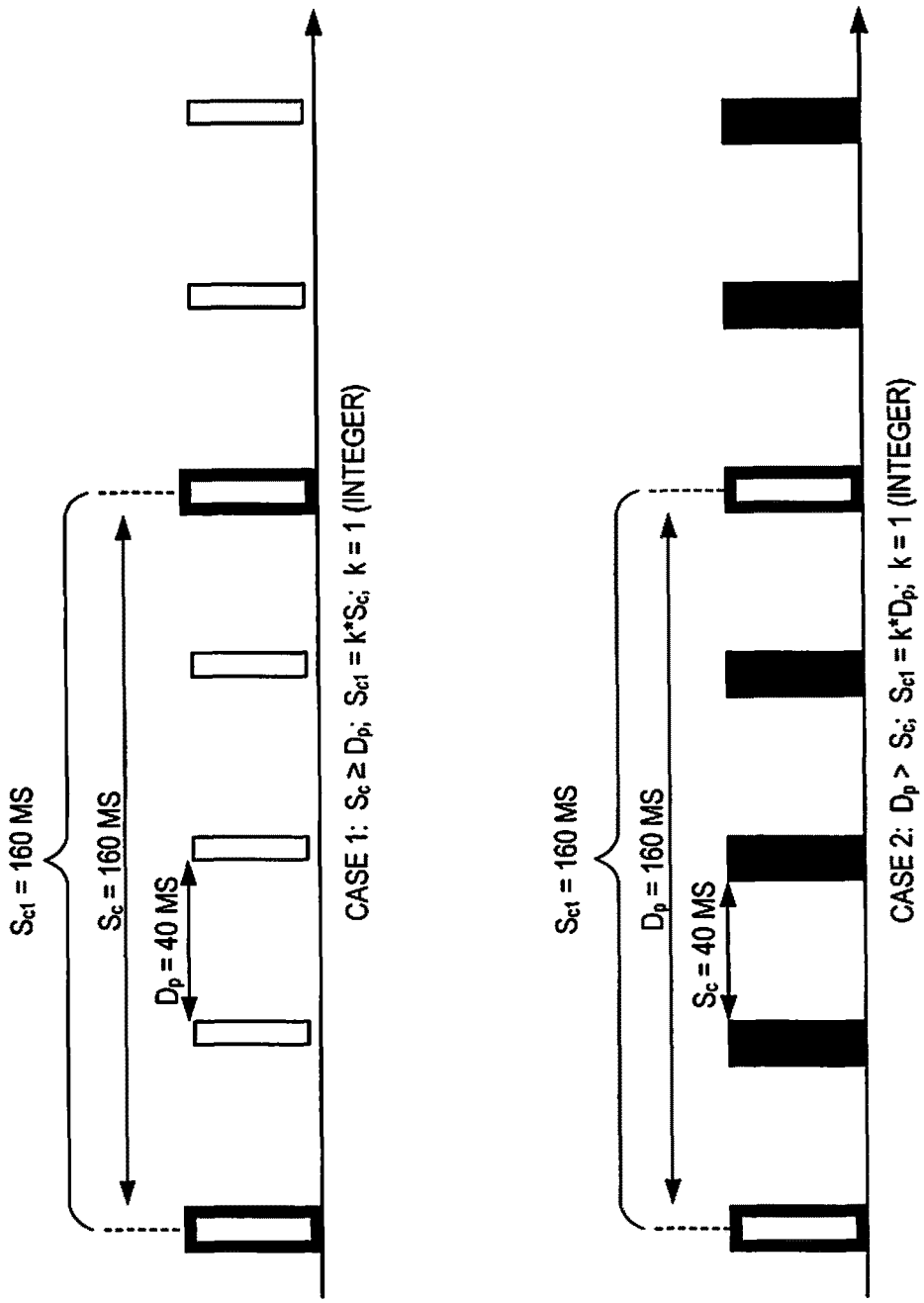
FIG. 4 illustrates an example of an aligned discovery signal periodicity ($D_p$) and a Secondary Cell (SCell) measurement cycle parameter ($S_c$) used to determine an actual measurement cycle period ($S_{c1}$) according to some embodiments of the present disclosure.

FIG. 4 illustrates an example of an aligned periodicity ($D_p$) of a discovery signal and a SCell measurement cycle parameter ($S_c$) used to determine an actual measurement cycle parameter ($S_{c1}$), which is used to perform one or more measurements, according to some embodiments of the present disclosure.

As illustrated in case 1 of FIG. 4, in some embodiments, if the SCell measurement cycle parameter ($S_c$) is larger or equal to the periodicity ($D_p$) of the discovery signal, then the wireless device 20 can obtain the actual measurement cycle parameter ($S_{c1}$) by aligning the (adjusted) measurement cycle parameter ($S_{c1}$) to the SCell measurement cycle parameter ($S_c$). In other words, in this example, $S_{c1}=S_c$ if $S_c \geq D_p$.

As illustrated in case 2 of FIG. 4, in some embodiments, if the SCell measurement cycle parameter ($S_c$) is less than the periodicity ($D_p$) of the discovery signal, then the wireless device 20 can obtain the actual measurement cycle parameter ($S_{c1}$) by aligning the actual measurement cycle parameter ($S_{c1}$) to the periodicity ($D_p$) of the discovery signal. In other words, in this example, $S_{c1}=D_p$ if $S_c<D_p$.

As illustrated in either case 1 or case 2 of FIG. 4, in some embodiments, the wireless device 20 can use a maximum of the SCell measurement cycle parameter ($S_c$) and the periodicity ($D_p$) of the discovery signal as the actual measurement cycle parameter ($S_{c1}$) to be used for performing the measurement(s).

Figure 5A:
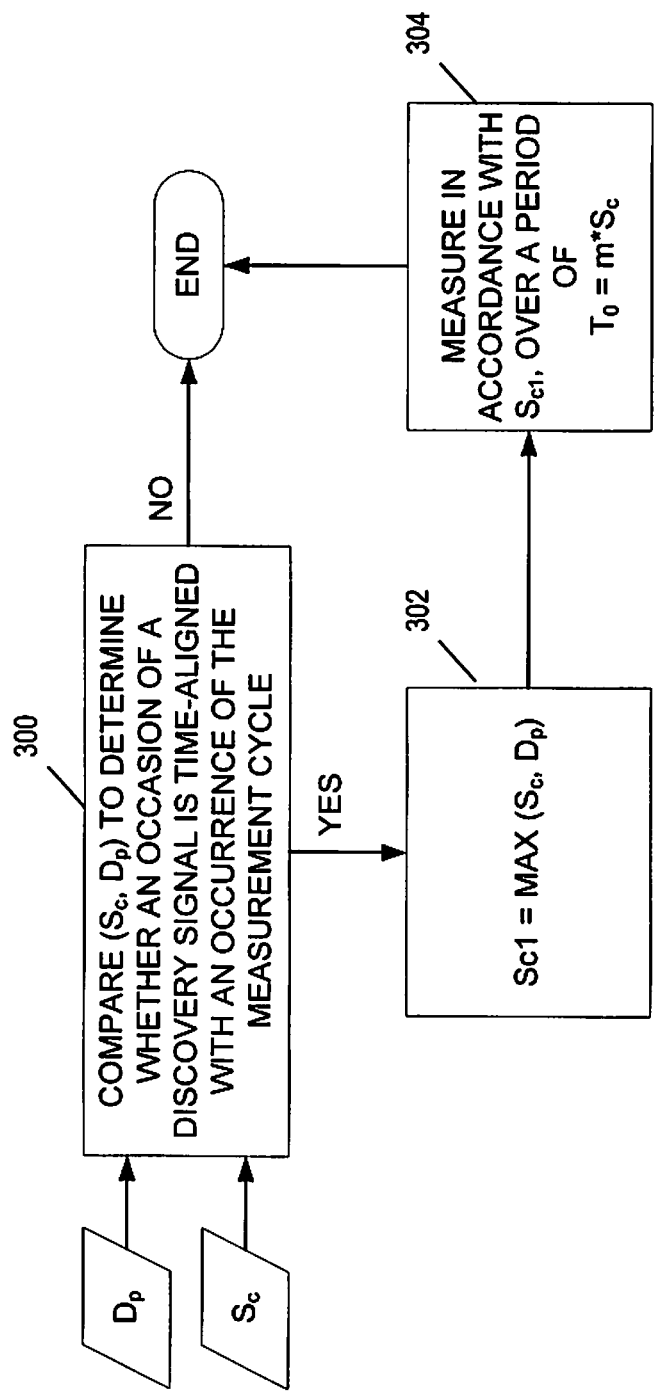
FIG. 5A is a flow chart that illustrates a process for determining an actual measurement cycle parameter ($S_{c1}$) as a maximum of the periodicity ($D_p$) of the discovery signal and the measurement cycle parameter ($S_c$) according to some embodiments of the present disclosure.
Figure 5B:
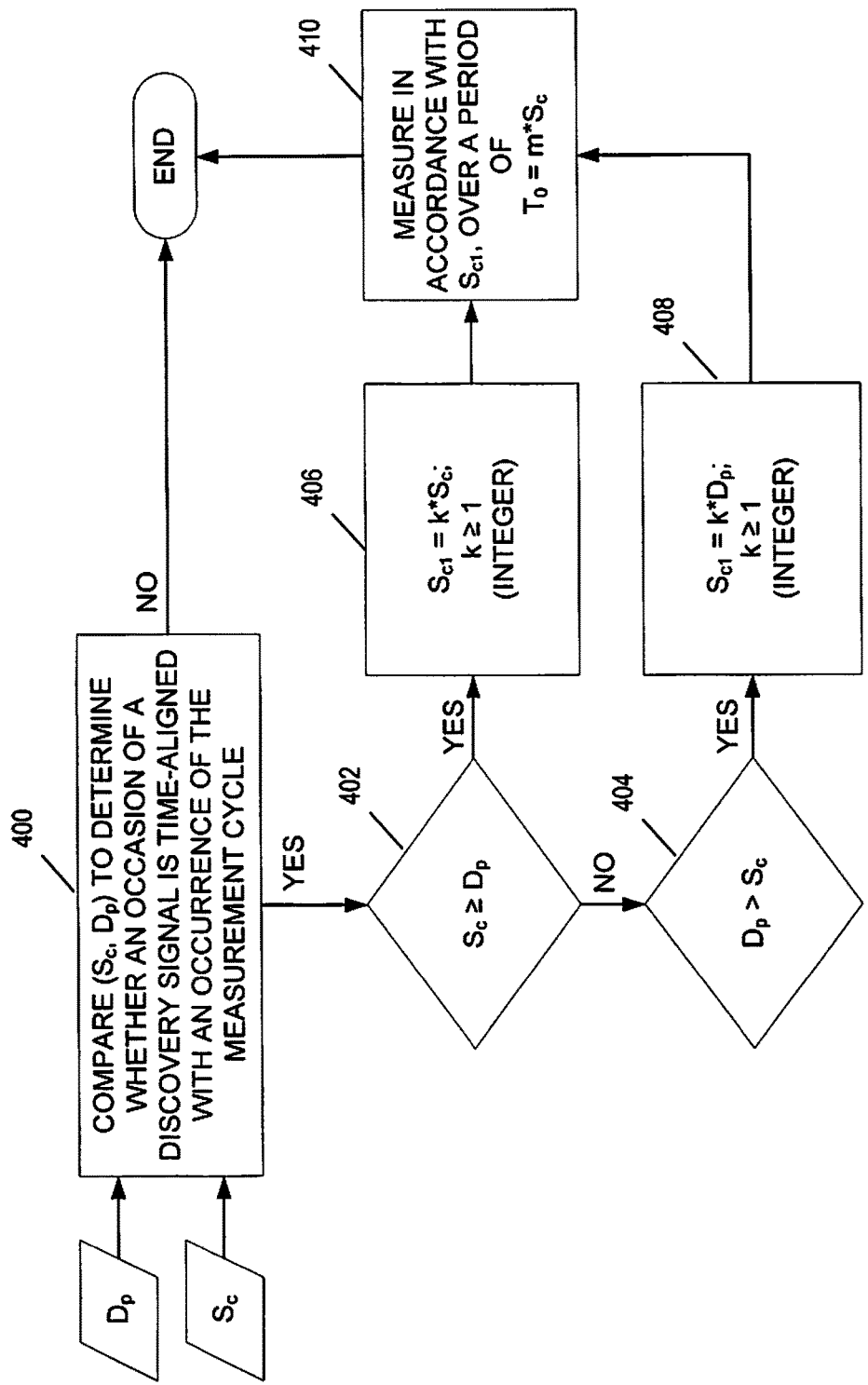
FIG. 5B is a flow chart that illustrates a process for determining the actual measurement cycle parameter ($S_{c1}$) as either the measurement cycle parameter ($S_c$) or the periodicity ($D_p$) of the discovery signal, multiplied by an integer (k), depending on a comparison of the measurement cycle parameter ($S_c$) and the periodicity ($D_p$) of the discovery signal according to some embodiments of the present disclosure.

FIGS. 5A and 5B are flow charts that illustrate methods comprising comparison rules for determining the actual measurement cycle parameter ($S_{c1}$). In other words, the following comparison rules can be used to determine the actual measurement cycle parameter ($S_{c1}$).

As illustrated in FIGS. 5A and 5B, the wireless device 20 compares the SCell measurement cycle parameter ($S_c$) and the periodicity ($D_p$) of the discovery signal to determine whether an occasion of a discovery signal is time-aligned with an occurrence of the SCell measurement cycle parameter ($S_c$) of the measurement cycle parameter (steps 300, 400). As used herein, an "occasion" of the discovery signal is one instance, or repetition, of the discovery signal, where the discovery signal is repeated over time (e.g., periodically). Similarly, the SCell measurement cycle ($S_c$) defines multiple occurrences (which may be referred to herein as measurement occurrences), where these occurrences occur according to the periodicity defined by the SCell measurement cycle ($S_c$). This time-alignment can be determined based on the known values of the SCell measurement cycle ($S_c$) and the periodicity ($D_p$) of the discovery signal along with corresponding starting/reference times for the SCell measurement cycle ($S_c$) and the periodicity ($D_p$) of the discovery signal. For example, if $S_c=160$ ms, $D_p=40$ ms, and the starting time for $D_p$ is 20 ms after the starting time for $S_c$, then the wireless device 20 determines that an occasion of the discovery signal is not time-aligned with an occurrence of the measurement cycle because there is no occasion of the discovery signal at the 40 ms periodicity that will be time-aligned with an occurrence of the measurement cycle at the periodicity $S_c$. However, if $S_c=160$ ms, $D_p=40$ ms, and the starting time for $D_p$ is 40 ms after the starting time for $S_c$, then the wireless device 20 may determine that an occasion of the discovery signal is time-aligned with an occurrence of the measurement cycle because the third occasion of the discovery signal (at 120 ms from the starting time for $D_p$) is time-aligned with the first occurrence of the measurement cycle (at 160 ms from the starting time for $D_p$).

In the embodiment of FIG. 5A, if an occasion of the periodicity ($D_p$) of the discovery signal and an occurrence of the SCell measurement cycle ($S_c$) can be time-aligned, then the actual measurement cycle parameter ($S_{c1}$) can be determined as a maximum of the periodicity ($D_p$) of the discovery signal and the SCell measurement cycle ($S_c$) (steps 300, 302). In contrast, in the embodiment of FIG. 5B, if an occasion of the periodicity ($D_p$) of the discovery signal and an occurrence of the SCell measurement cycle ($S_c$) can be time-aligned, then the actual measurement cycle parameter ($S_{c1}$) can be determined in different ways based on a comparison of the periodicity ($D_p$) of the discovery signal and the SCell measurement cycle ($S_c$) (steps 400 through 408). More specifically, when $S_c$ is greater than or equal to $D_p$ (step 402), then $S_{c1}$ can be set to $S_c$ multiplied by an integer value (k) which is greater than or equal to 1 (step 406). Conversely, when $D_p$ is greater than $S_c$ (step 404), then $S_{c1}$ can be set to $D_p$ multiplied by an integer value (k) which is greater than or equal to 1 (step 408). Then, in both the embodiment of FIG. 5A and the embodiment of FIG. 5B, one or more measurement(s) are then performed in accordance with the determined actual measurement cycle parameter ($S_{c1}$), over a period that may correspond to the SCell measurement cycle ($S_c$) multiplied by a value (m) (steps 304, 410).

As detailed above, in some embodiments, when the actual measurement cycle parameter ($S_{c1}$) is determined, the wireless device 20 performs the measurement(s) over a period of time (denoted by $T_0$), where the period $T_0=m*S_{c1}$ and (m) is configured to be large enough such that reliable measurements can be achieved. In some embodiments, the value of m may also be predefined. In some embodiments, the value of (m) may also be linked to the value of the actual measurement cycle parameter ($S_{c1}$). In some embodiments, the value of (m) may also depend upon the type of measurement, e.g., m=5 for Reference Signal Received Power (RSRP) and Reference Signal Received Quality (RSRQ); m=20 for cell identification. In some embodiments, the wireless device 20 also meets one or more predefined requirements corresponding to the performed measurement(s), e.g., measurement accuracy of RSRP/RSRQ, number of identified cells to measurement on SCC, etc.

As discussed above with respect to, e.g., steps 300 and 400 of FIGS. 5A and 5B, respectively, if the SCell measurement cycle ($S_c$) and the periodicity ($D_p$) of the discovery signal cannot be aligned (e.g., time-aligned) within a reasonable measurement period, the wireless device 20 does not perform the measurement(s). A reasonable measurement period, as referred to herein, means that it would lead to acceptable measurement performance, e.g., in terms of measurement accuracy, measurement time, etc. An example of reasonable measurement period is $5 \times S_c$ for RSRP, RSRQ, and wireless device 20 receive-transmit time difference measurement, $20 \times S_c$ for cell identification, etc.

In some embodiments, the wireless device 20 may use the performed measurements for one or more radio operations, e.g., for reporting the measurements to a network node (e.g., the base station 12), for using the measurements for mobility operations such as cell change, storing in the memory for future use, etc.

In some embodiments, the wireless device 20 may perform the above steps of determining or adjusting the SCell measurement cycle ($S_c$) and using the SCell measurement cycle ($S_c$) for measurements on cells on a SCC for each of the configured SCCs.

In some embodiments, if the wireless device 20 does not perform measurement(s) based on the outcome of the comparison, then the wireless device 20 may also inform the base station 12 about a reason of failure or a reason for an inability to perform the measurement.

In some embodiments, it may also be predefined that the wireless device 20 is configured with a SCell measurement cycle ($S_c$) and with information related to discovery signals (e.g., periodicity ($D_p$) of a discovery signal). Then, the wireless device 20 may or shall perform measurement(s) on one or more cells on that SCC with a deactivated SCell 18, provided that the SCell measurement cycle ($S_c$) and the periodicity ($D_p$) of the wireless device are related by a relation; examples of a relation are $D_p = N*S_c$, $D_p < S_c$, etc.

In some embodiments, the base station 12 may also take into account the adjustment of SCell measurement cycle ($S_c$) (e.g., to determine the actual measurement cycle parameter ($S_{c1}$)) done by the wireless device 20 for performing the measurement(s) on cells on a SCC, for one or more operations of the base station 12. For example, if the wireless device 20 uses a SCell measurement cycle ($S_{c1}$) different than the SCell measurement cycle ($S_c$) configured by the base station 12, then the base station 12 may change one or both of the SCell measurement cycle ($S_c$) and the periodicity ($D_p$) of the discovery signal. More specifically, the base station 12 may align the SCell measurement cycle ($S_c$) and the periodicity ($D_p$) of the discovery signal, and configure the same values of the two parameters to the wireless device 20.

As indicated above, embodiments disclosed herein include methods of operation of the wireless device 20 to obtain an actual measurement cycle ($S_{c1}$), with or without knowledge of a periodicity ($D_p$) of a discovery signal.

Figure 6:
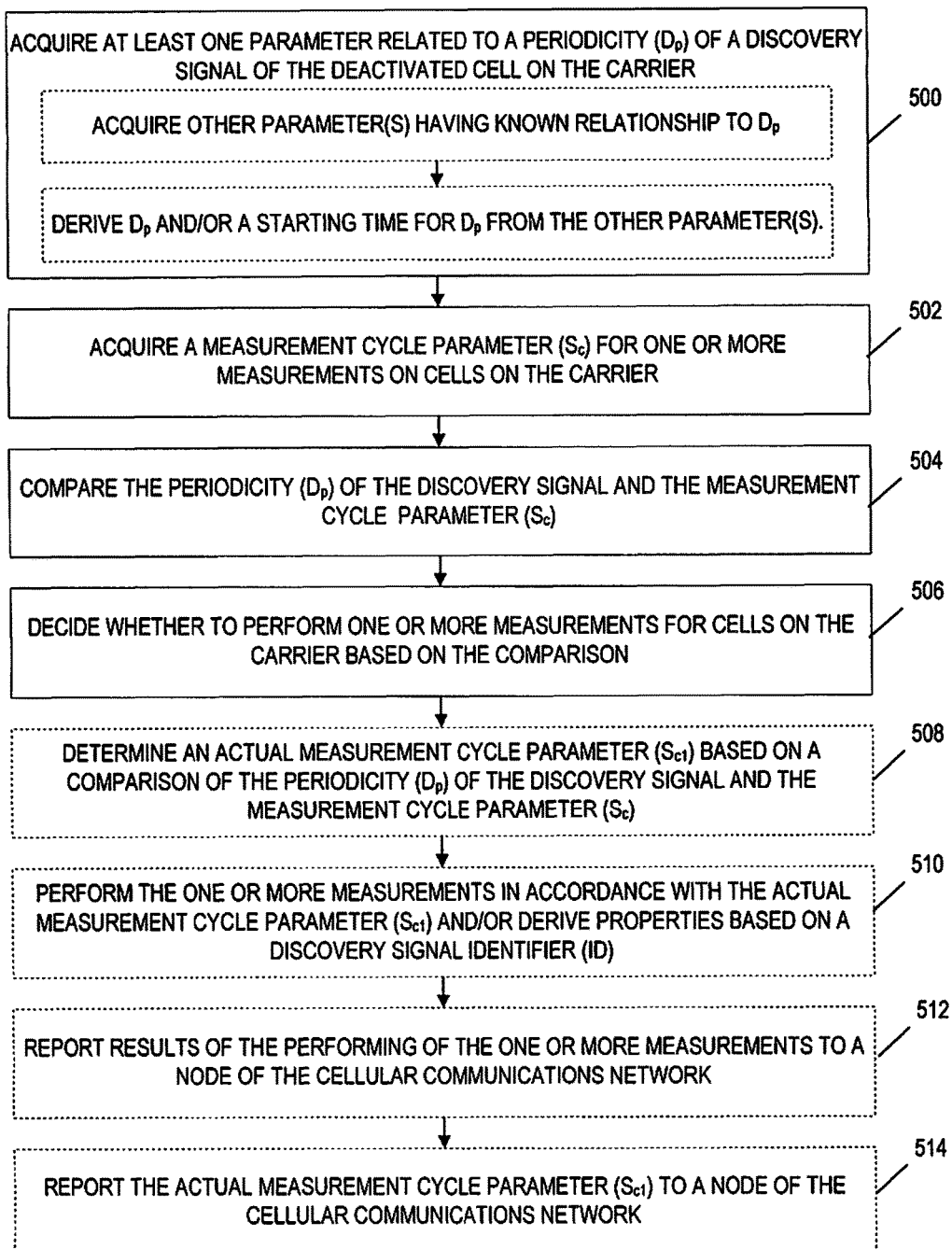
FIG. 6 is a flow chart that illustrates an embodiment similar to the embodiment shown in FIG. 4, but uses derived parameters to determine whether to perform one or more measurements according to some embodiments of the present disclosure.

FIG. 6 shows a flowchart that is similar to the embodiment shown in FIG. 3, except that FIG. 6 illustrates deriving values for the parameter(s) related to the periodicity ($D_p$) of the discovery signal from other parameter(s) that have a known relationship to the parameter(s) related to the periodicity ($D_p$) of the discovery signal. The other parameter(s) from which the parameter(s) related to the periodicity ($D_p$) of the discovery signal are derived may be, for example, a discovery signal ID, measurement bandwidth, cell transmission bandwidth, expected measurement time of a measurement to be performed on a discovery signal, radio conditions, radio channel characteristics, etc. Further, the other parameters may be predefined or otherwise known to the wireless device 20 or transmitted by any node of cellular communications network 10. The wireless device 20 can then derive the parameter(s) related to the periodicity ($D_p$) of the discovery signal (e.g., $D_p$ and, in some embodiments, a starting time for $D_p$) from the parameter(s).

FIG. 6 is a flow chart that illustrates the operation of the wireless device 20 to determine whether to perform one or more measurements on a carrier associated with a deactivated cell based on a comparison of a periodicity ($D_p$) of a discovery signal and a SCell measurement cycle parameter ($S_c$) according to some embodiments of the present disclosure. This process is a more detailed embodiment of the process of FIG. 2 from the perspective of the wireless device 20. Again, in this example, the carrier is the SCC, and the deactivated cell is the deactivated SCell 18; however, the present disclosure is not limited thereto.

When a wireless device 20 is configured on one or more cells on a SCC and is requested to perform measurements on the cell(s) on the SCC, the wireless device 20 is signaled by the higher layer, and the signals include a SCell measurement cycle parameter ($S_c$). This could, for example, be the case where the wireless device 20 is configured with at least one deactivated SCell 18 on the SCC. In some embodiments, the wireless device 20 can also be configured to operate with more than one SCC, e.g., a first SCC and a second SCC. In some embodiments, the SCell measurement cycle parameter ($S_c$) can be the same or different for performing measurements on cells belonging to different configured SCCs. Although the cellular communications system 10 (e.g., the RRH 16 of the deactivated SCell 18) is transmitting the discovery signal to the wireless device 20, the actual periodicity ($D_p$) of the discovery signal is not necessarily signaled to the wireless device 20.

As illustrated in FIG. 6, the wireless device 20 acquires at least one parameter related to a periodicity ($D_p$) of a discovery signal of the deactivated SCell 18 on the SCC (step 500). In some embodiments, the parameter(s) have a known relationship to the periodicity ($D_p$) of the discovery signal. The value of the periodicity ($D_p$) of the discovery signal can then be derived from the parameter(s) based on the known relationship between the parameter(s) and the periodicity ($D_p$) of the discovery signal. In some embodiments, a starting time for the periodicity ($D_p$) of the discovery signal can be derived from the parameter(s). In some embodiments, the wireless device 20 receives the at least one parameter related to the periodicity ($D_p$) of the discovery signal of the deactivated SCell 18 via a transmission(s) (e.g., signaling) from the cellular communications network (e.g., by the base station 12).

The wireless device 20 also acquires a SCell measurement cycle parameter ($S_c$) to perform one or more measurements on cell(s) on the SCC (step 502). The SCell measurement cycle parameter ($S_c$) is, in some embodiments, signaled or otherwise transmitted to the wireless device 20 from the cellular communications network (e.g., from the base station 12). In some embodiments, the wireless device 20 receives a request from a radio access node (e.g., the base station 12) to perform measurement(s) on the carrier of the SCell 18, wherein the request may include the SCell measurement cycle parameter ($S_c$). The wireless device 20 then compares the derived periodicity ($D_p$) of the discovery signal and the SCell measurement cycle parameter ($S_c$) (step 504). Based on the comparison, the wireless device 20 decides whether to perform measurement(s) for cell(s) on the SCC associated with the deactivated SCell 18 (step 506).

While not essential, the process may further include one or more of the following steps. In some embodiments, the wireless device 20 determines an actual measurement cycle parameter ($S_{c1}$) to be used for performing measurements on the cell(s), including the deactivated SCell 18, on the SCC based on the comparison of the periodicity ($D_p$) of the discovery signal and the SCell measurement cycle parameter ($S_c$) (step 508). In some embodiments, the wireless device 20 then performs measurement(s) on the cell(s), including the deactivated SCell 18, on the SCC in accordance with the actual measurement cycle parameter ($S_{c1}$) (step 510). In some embodiments, the wireless device 20 may acquire additional properties about the discovery signal based on an ID associated with the discovery signal, where the ID is known or could be determined by the wireless device 20 (step 510). The wireless device 20 may then, in some embodiments, report the results from the performing of the measurement(s) to a node (e.g., the base station 12) of the cellular communications system 10 (step 512). Lastly, the wireless device 20 may, in some embodiments, report the actual measurement cycle parameter ($S_{c1}$) to a node (e.g., the base station 12) of cellular communications system 10 (step 514).

The operation of the wireless device 20 as illustrated by the process shown in FIG. 6 may include making some assumptions related to or about the periodicity ($D_p$) of the discovery signal. In some embodiments, the wireless device 20 may make assumptions regarding the periodicity ($D_p$) of the discovery signal in relation to the SCell measurement cycle parameter ($S_c$), which the wireless device 20 knows for that SCC. For example, the wireless device 20 may assume that the periodicity ($D_p$) of the discovery signal is aligned with the SCell measurement cycle parameter ($S_c$), such that $D_p=N*S_c$, where N is a configurable value or N can also be predefined. The value of N can also be linked to the SCell measurement cycle parameter ($S_c$) by a predefined relation. In some embodiments, a special case is N=1. In some embodiments, values derived from parameter(s) related to the periodicity ($D_p$) of the discovery signal have an assumed (rather than known) relationship to the parameter(s) related to the periodicity ($D_p$) of the discovery signal.

The wireless device 20 may determine, for example, an occasion of occurrence of the discovery signal, i.e., the periodicity of the occurrence of the discovery signal. This can be determined based on a relationship between the periodicity ($D_p$) of the discovery signal and the SCell measurement cycle parameter ($S_c$) as explained with examples provided in this disclosure. In some embodiments, the assumptions regarding the relation between the periodicity ($D_p$) of the discovery signal and the SCell measurement cycle parameter ($S_c$) can also be based on one or more predefined rule(s), or autonomously determined by the wireless device 20. For example, the relation may be predefined in a standard such that if a network node (e.g., a SCell 18) does not configure the wireless device 20 with the information about discovery signal(s) (e.g., periodicity), then the wireless device 20 may assume that the $D_p=N*S_c$ for performing measurements (e.g., cell identification, RSRP, RSRQ, etc.) on cells on a SCC with a deactivated SCell 18. The wireless device 20 then performs measurements on the discovery signal(s) by using the actual measurement cycle parameter ($S_{c1}$), and determines the occasion of the discovery signal.

As detailed above, in some embodiments, the wireless device 20 may perform measurement(s) over a period of time ($T_0$) where the period $T_0=m*Sc$. The value of (m) may be configured to be large enough such that reliable measurements can be achieved. For example, $T_0=5*Sc$. In some embodiments, the value of (m) can also be predefined. In some embodiments, the value of (m) may also depend upon the type of measurement(s), e.g., m=5 for RSRP and RSRQ; m=20 for cell identification.

In some embodiments, the wireless device 20 may use the performed measurement(s) for one or more radio operations, e.g., for reporting the measurements to the network node (e.g., the base station 12), for using the measurements for mobility operations such as cell change, for storing in memory for future use, etc.

In some embodiments, as detailed above, the wireless device 20 can (optionally) report the assumed or determined periodicity ($D_p$) of the discovery signal for performing measurements ($S_{c1}$) to the network node 12 along with the measurement(s) report, or may report this information independently of each other. In some embodiments, the parameter N can be reconfigured if needed, desired, or necessary. The network node receiving the wireless device 20's determined periodicity ($D_p$) of the discovery signal (e.g., network node 12) may decide to update the SCell measurement cycle parameter ($S_c$) accordingly. The network node (e.g., the base station 12) may also use this information for interpreting measurement results, e.g., a measurement period used by the wireless device 20 for performing measurement(s) on cell(s) of a SCC.

In some embodiments, the wireless device 20 may perform the above steps of determining the actual measurement cycle parameter ($S_{c1}$) and using it for measurements on cells on a SCC for each of a group of configured SCCs (e.g., the SCCs that the wireless device 20 has been configured to use).

In some embodiments, the wireless device 20 has two different sets of measurements to perform. The first set of measurement may consist of RRM measurements, and the second set may consist of QCL, coarse time, and frequency synchronization to aid demodulation of that data. As a default, the wireless device 20 measures the first set only and can, in addition, for a certain amount of discovery signal(s), be configured to measure the second set. It should be understood as well that either of the first and second set can also contain other type(s) of measurements that have not been provided herein.

Figure 7:
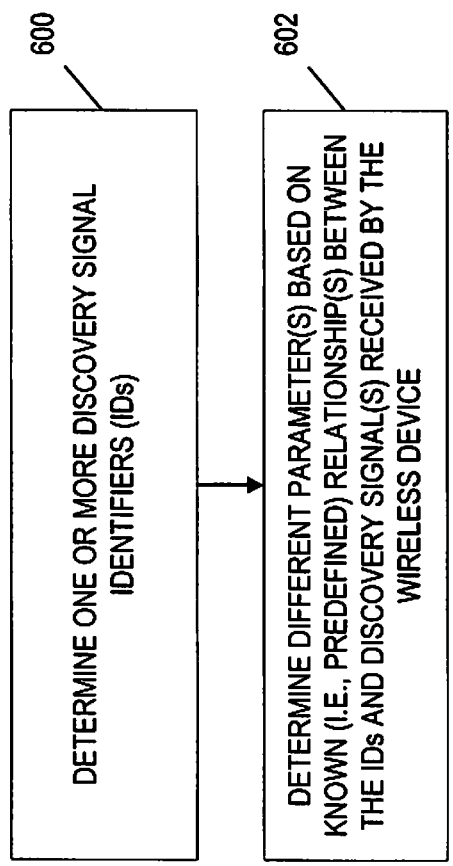
FIG. 7 is a flow chart that illustrates a process for using discovery signal Identifiers (IDs) to derive different parameters from discovery signal(s) associated with the IDs according to some embodiments of the present disclosure.

As indicated above, embodiments disclosed herein include methods of operation for the wireless device 20 and the cellular communications system 10 for acquiring different parameters (e.g., properties) from one or more discovery signals based on discovery signal identifiers (IDs). FIG. 7 is a flow chart that illustrates a process for using discovery signal IDs to derive different parameters from discovery signal(s) associated with the IDs according to some embodiments of the present disclosure. First, the wireless device 20 can determine one or more discovery signal IDs (step 600). In some embodiments, the network node (e.g., the base station 12) can configure the wireless device 20 with one or more different discovery signal ID(s) so that the wireless device 20 can determine IDs based on this configuration. For example, the network node (e.g., an eNB) could configure the wireless device 20 with different sets of IDs based on use cases and with consideration to any complexity of the wireless device 20, and with consideration for energy consumption. Lastly, the wireless device 20 can determine parameter(s) (e.g., properties) based on known (i.e., predefined) relationship(s) between the Ds and discovery signal(s) received by the wireless device 20 (step 602). For example, when the wireless device 20 performs measurement(s) on discovery signal(s), the wireless device 20 can be configured to derive different parameters (e.g., properties) related to reception of radio signals based on different discovery signal Ds. Therefore, depending on the types of discovery signal(s) and associated ID(s), there can be several embodiments for different use cases.

Examples of properties that the wireless device 20 can derive include RRM measurements (e.g., RSRP and RSRQ), RLM related measurements (e.g., out of sync and in sync detections), QCL of transmitting nodes (e.g., antennas, radio nodes transmitting signals), RSTD, CSI, and time synchronization between radio nodes transmitting discovery signals and frequency synchronization of transmitted signals. The configuration of what the wireless device 20 should measure can be defined in different ways as illustrated below with several embodiments.

In some embodiments, a discovery signal itself can be associated with an ID, where the ID indicates a set of one or more properties that can be derived from the discovery signal. A property set may contain one or more properties that can be derived from the discovery signal such as, for example, RRM measurements, RLM related measurements, QCL, CSI feedback, coarse time and frequency synchronization, fine time and frequency synchronization, and RSTD, and the like.

In some embodiments, a node in the cellular communications system 10 can configure a wireless device 20 with one or more discovery signal IDs such that the wireless device 20 can derive one or more properties from the discovery signal(s). For example, the wireless device 20 could be configured with two IDs used to derive two sets of properties from respective discovery signals.

In some embodiments, the wireless device 20 can assume a default discovery signal ID for some properties such as, for example, RRM measurement(s). The cellular communications system 10 may not necessarily transmit signals to the wireless device 20 with the default discovery signal ID. In some embodiments, the cellular communications system 10 can configure the wireless device 20 with one or more discovery signal IDs such that the wireless device 20 can derive one or more properties from the discovery signal(s) in addition to default properties, as detailed above.

Notably, configuring a wireless device 20 with discovery signal ID(s) is not limited to discovery signal(s) transmitted exclusively from a deactivated SCell 18, and is applicable to any and all cells of cellular communications system 10.

As a result of the foregoing processes in the embodiments detailed above, the wireless device 20's measurement behavior is well specified to lead to consistent measurement results for measurement(s) performed on cells of SCC(s) with a deactivated SCell 18 that uses an on/off scheme. Unlike conventional systems, the complexity of measuring on cells by a wireless device 20 on a SCC with a deactivated SCell 18 by using discovery signal(s) is reduced as a result of the embodiments disclosed herein. The disclosed methods also enable the wireless device 20 to save its battery, or use its battery more efficiently, when measuring on cells using discovery signals because battery consumption is reduced. Moreover, signaling overheads can also be reduced (e.g., by avoiding signaling of discovery signal periodicity) as a result of the embodiments disclosed herein.

Figure 8:
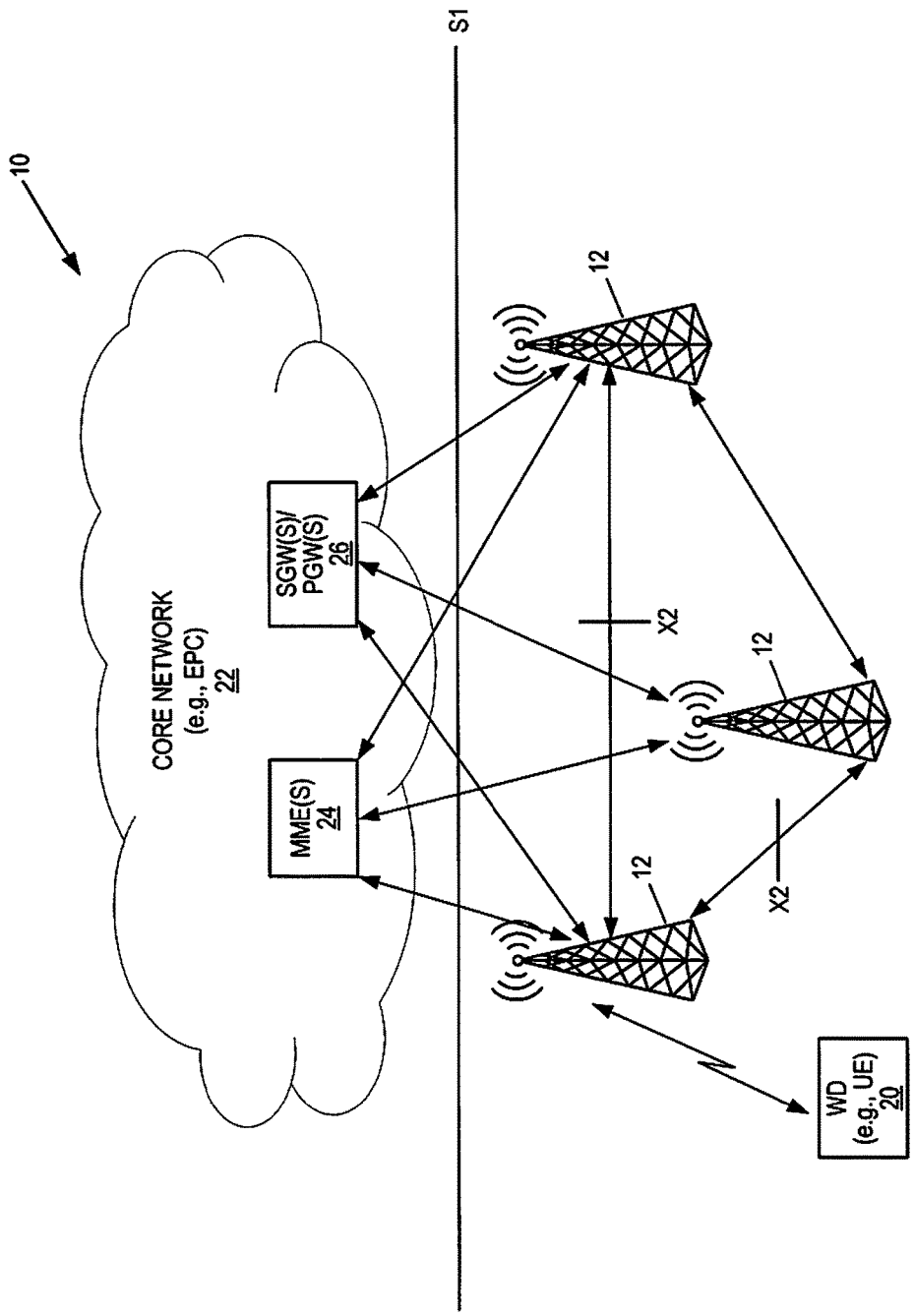
FIG. 8 illustrates a block diagram of a Long Term Evolution (LTE) cellular communications system.

Although the illustrated cellular communications system 10 may represent any network that includes any suitable combination of nodes (e.g., network nodes or wireless devices), the cellular communications system 10 may, in particular embodiments, represent a network such as the example cellular communications system 10 illustrated by FIG. 8.

As illustrated in FIG. 8, this non-limiting block diagram is of an LTE cellular communications system 10, according to some embodiments. As detailed above, nodes in a core network 22 include one or more MMEs 24, a key control node for the LTE access network, and one or more Serving Gateways/Packet Data Network Gateways (SGWs/PGWs) 26, which route and forward user data packets while acting as a mobility anchor. The core network 22 nodes communicate with base stations 12, referred to in LTE as eNBs or eNodeBs, over an interface such as, for example, an S1 interface. The network nodes (e.g., base station 12 such as an eNB) can include the same or different categories of eNBs, e.g., macro eNBs, and/or micro/pico/femto eNBs. The network nodes 12 (e.g., eNBs) communicate with each other over interfaces such as, for example, X2 interfaces. The S1 interface and the X2 interfaces are defined in the LTE standard. A wireless device 20 can receive downlink data from, and send uplink data to, one of the base stations 12, with that base station 12 being referred to as the serving base station 12 of that wireless device 20.

Figure 9:
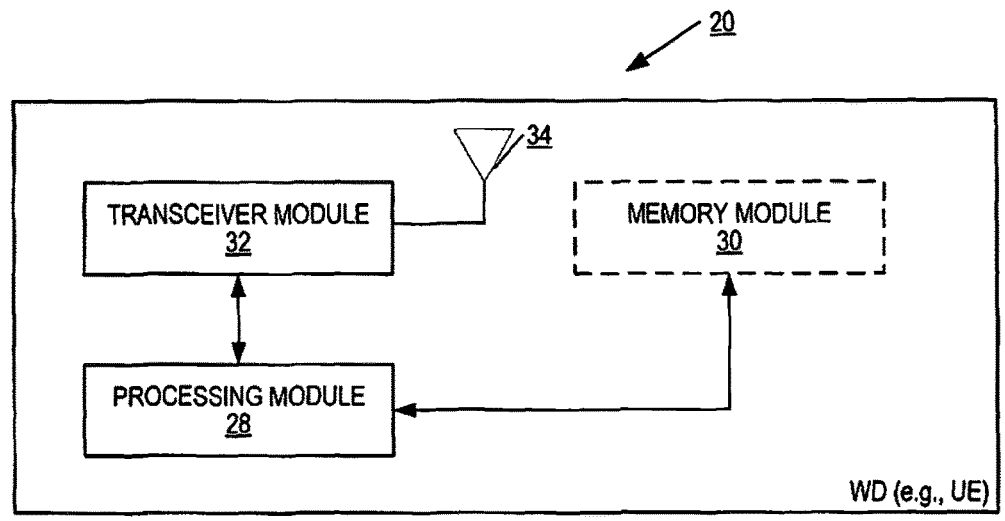
FIG. 9 is a block diagram of a wireless device according to some embodiments of the present disclosure.
Figure 10:
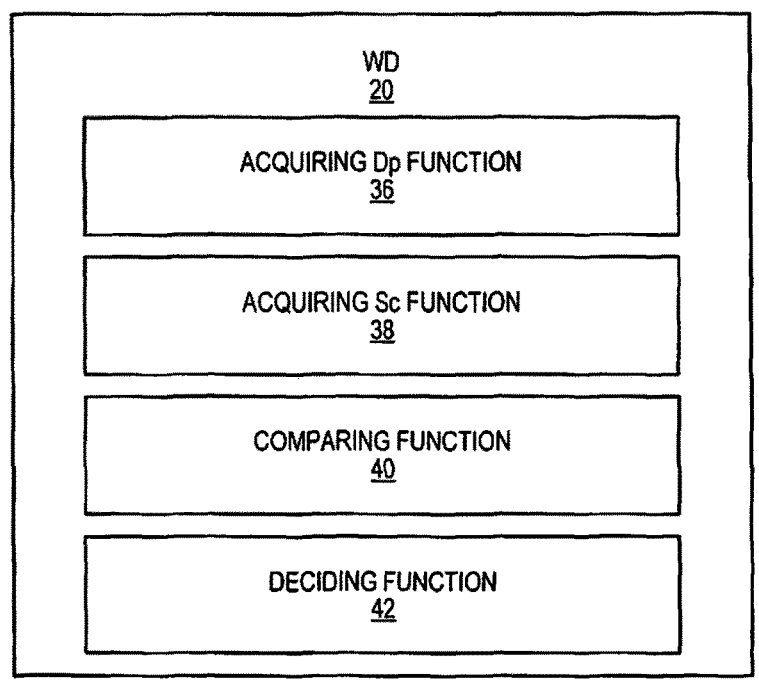
FIG. 10 is a block diagram of a wireless device according to some embodiments of the present disclosure.

Although the illustrated wireless device 20 may represent a communication device that includes any suitable combination of hardware and/or software, this wireless device 20 may, in particular embodiments, represent a device such as the example wireless device 20 illustrated in greater detail by FIGS. 9 and 10. Similarly, although a network node may represent network nodes that include any suitable combination of hardware and/or software, these nodes may, in particular embodiments, represent devices such as the example network node 44 illustrated in greater detail by FIGS. 11 and 12. In a similar manner, although the core network 22 nodes may represent core nodes that include any suitable combination of hardware and/or software, these core network 22 nodes may, in particular embodiments, represent devices such as the example core network node 64 illustrated in greater detail by FIG. 13.

As would be appreciated by one of skill in the art upon reading this disclosure, as used herein, the term "module" is hardware or a combination of hardware and software that may be comprised in, for example, an electronic device. For example, a "transceiver module" operates to transmit and receive signals via the connected antenna(s) according to any of the embodiments described herein. In other words, a transceiver module consists of one or more hardware components/circuits or, in other implementations, a combination of hardware and software. In particular, a transceiver module includes a transmitter(s) and a receiver(s) coupled to antenna(s), where, as understood by those of ordinary skill in the art, each transmitter/receiver includes components such as amplifiers, filters, etc.

Likewise, as would be appreciated by one of skill in the art upon reading this disclosure, the term "processing module," as used herein, is hardware or a combination of hardware and software that performs processing according to any of the embodiments described herein. In other words, a processing module consists of one or more hardware components/circuits or, in some implementations, a combination of hardware and software. In particular, a processing module includes one or more processors, or processing circuits (e.g., Central Processing Unit(s) (CPU(s)), Application Specific Integrated Circuit(s) (ASIC(s)), and/or Field Programmable Gate Array(s) (FPGA(s))).

In a similar manner, as would be appreciated by one of skill in the art upon reading this disclosure, the term "memory module," as used herein, is hardware or a combination of hardware and software that operates as memory. In other words, a memory module consists of one or more hardware components/circuits or, in some implementations, a combination of hardware and software. In particular, a memory module includes one or more memory components (e.g., Random Access Memory (RAM)).

FIG. 9 is a block diagram of a wireless device 20 (e.g., a UE), according to some embodiments of the present disclosure. The wireless device 20 can be used in one or more of the non-limiting exemplary embodiments described herein.

As illustrated, the wireless device 20 includes one or more processing modules 28 (e.g., CPU(s), ASIC(s), FPGA(s)) coupled to a memory module 30, and a transceiver module 32, which may include one or more transmitters and one or more receivers coupled to one or more antennas 34. The wireless device 20 may, in some embodiments, be a mobile device that is configured for M2M or Machine-Type Communication (MTC). The wireless device 20's processing module 28 controls the operation of the wireless device 20. The processing module 28 is coupled to the transceiver module 32 with the associated antenna(s) 34, which are used to receive signals from, or both transmit signals to and receive signals from, the base station 12 or the RRH 16 in the cellular communications system 10. To make use of Discontinuous Reception (DRX), the processing module 28 can be configured to deactivate the transceiver module 32 for specified lengths of time.

As detailed above, the wireless device 20 also optionally comprises the memory module 30 that is coupled to the processing module 28, and that stores one or more programs, other information, and data required for the operation of the wireless device 20. In some embodiments, the functionality of the wireless device 20 described herein is implemented in software stored in the memory module 30, where the software is executed by the processing module 28 such that the wireless device 20 operates according to any of the embodiments described herein. In some embodiments, the wireless device 20 may optionally comprise a satellite positioning system (e.g., GPS) receiver module (not shown) that can be used to determine the position and speed of movement of the wireless device 20. Alternative embodiments of the wireless device 20 may include additional components beyond those shown in FIG. 9 that may be responsible for providing certain aspects of the wireless device 20's functionality, including any of the functionality described above and/or any functionality necessary to support the solution described above.

In some embodiments, a computer program including instructions which, when executed by the at least one processing module 28, causes the at least one processing module 28 to carry out the functionality of the wireless device 20 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory module 30).

FIG. 10 is a block diagram of the wireless device 20 according to some other embodiments of the present disclosure. As illustrated, the wireless device 20 includes an acquiring $D_p$ function 36, an acquiring $S_c$ function 38, a comparing function 40, and a deciding function 42, each of which is implemented in software. In some embodiments, the acquiring $D_p$ function 36 and the acquiring Sc function 38 are used to obtain the periodicity ($D_p$) of the discovery signal and the SCell measurement cycle parameter ($S_c$), respectively, from one or more nodes, as described above. The comparing function 40 operates to compare the obtained periodicity ($D_p$) of the discovery signal and SCell measurement cycle parameter ($S_c$), as described above. Lastly, the deciding function 42 operates to use the output of the comparing function 40 to decide whether to perform one or more measurements on a carrier associated with a deactivated cell, as described above.

Figure 11:
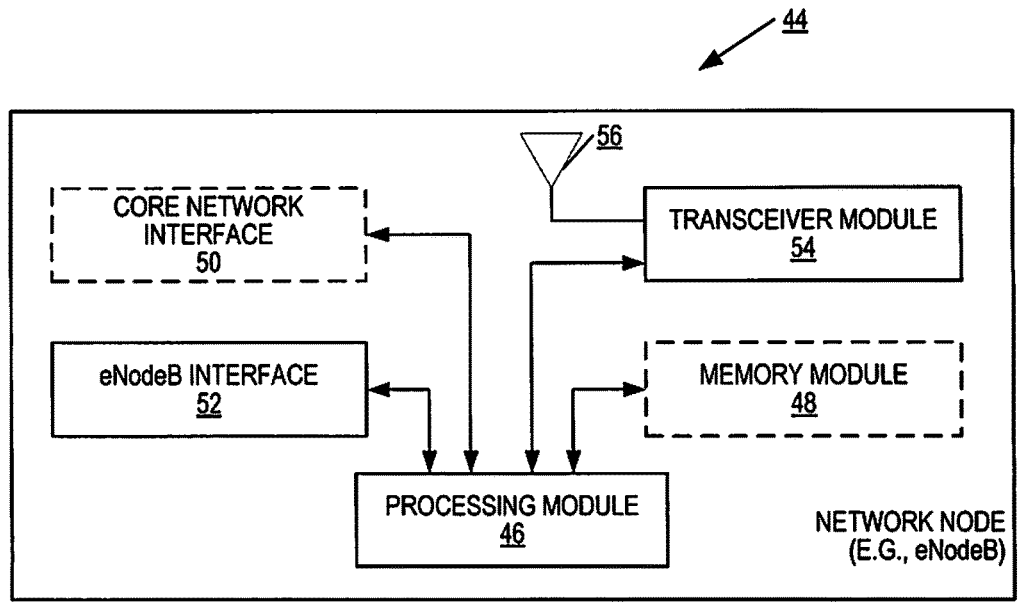
FIG. 11 is a block diagram of a network node according to some embodiments of the present disclosure.

FIG. 11 is a block diagram of a network node 44 according to some embodiments of the present disclosure. The network node 44 may be, e.g., any radio network node (e.g., including a base station, such as a Node B or an eNB). As illustrated, the network node 44 includes one or more processing modules 46 (e.g., CPU(s), ASIC(s), and/or FPGA(s)) coupled to optional memory module(s) 48, an optional core network interface 50, and an eNodeB interface 52. If the network node 44 is a radio network node (e.g., a base station 12), then the network node 44 also includes a transceiver module 54 including one or more transmitters and one or more receivers coupled to one or more antennas 56.

It should be appreciated that although a macro eNB will not in practice be identical in size and structure to a micro eNB, for the purposes of illustration, the network node 44 is assumed to include similar components. Thus, the processing module 46 controls the operation of the network node 44. The processing module 46 is coupled to the transceiver module 54 with the associated antenna(s) 56, which are used to transmit signals to, and receive signals from, wireless devices 20 in the cellular communications network 10.

As detailed above, the network node 44 may also optionally comprise the memory module 48 that is coupled to the processing module 46, and that stores one or more programs and other information and data required for the operation of the network node 44. The components and/or circuitry (e.g., the eNodeB interface 52) allow the network node 44 (e.g., the base station 12) to exchange information with other network nodes (base stations 12) (e.g., via an X2 interface), and may also optionally include components and/or circuitry (e.g., the core network interface 50) for allowing the network node 44 (e.g., the base station 12) to exchange information with nodes in the core network 22 (e.g., via the S1 interface). It will be appreciated that network node 44 (e.g., the base station 12) may be used in other types of networks (e.g., Universal Terrestrial Radio Access Network (UTRAN) or WCDMA Radio Access Network (RAN)) and may include similar components to those shown in FIG. 11, and appropriate interface circuitry 50 and 52 for enabling communications with the other network nodes in those types of networks (e.g., other base stations 12, MMEs 24, and/or nodes in the core network 22). In some embodiments, the functionality of the network node 44 is implemented in software and stored in the memory module 48 for execution by the processing module 46. Alternative embodiments of the network node 44 may include additional components responsible for providing additional functionality, including any of the functionality identified above and/or any functionality necessary to support the solution described above.

In some embodiments, a computer program including instructions which, when executed by at least one processing module 46, causes the at least one processing module 46 to carry out the functionality of the network node 44 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory module 48).

Figure 12:
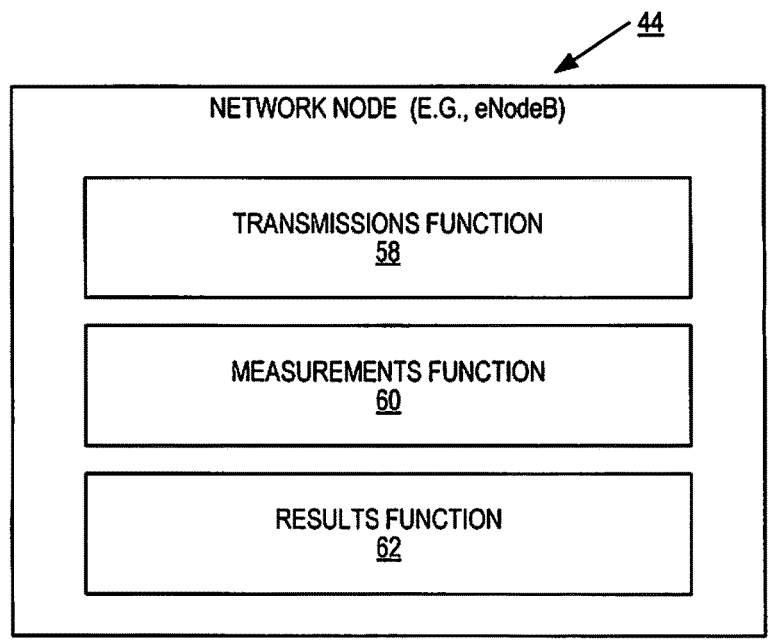
FIG. 12 is a block diagram of a network node according to some embodiments of the present disclosure.

FIG. 12 is a block diagram of the network node 44 according to some embodiments of the present disclosure. As illustrated, the network node 44 includes a transmissions function 58, a measurements function 60, and a results function 62. In some embodiments, the transmissions function 58 operates to transmit the periodicity ($D_p$) of the discovery signal and/or the SCell measurement cycle parameter ($S_c$), and the measurements function 60 operates to initiate a request for one or more measurements, as detailed above. Lastly, the results function 62 operates to obtains results of the performed one or more measurements and/or obtain an actual measurements cycle parameter ($S_{c1}$), as detailed above.

Figure 13:
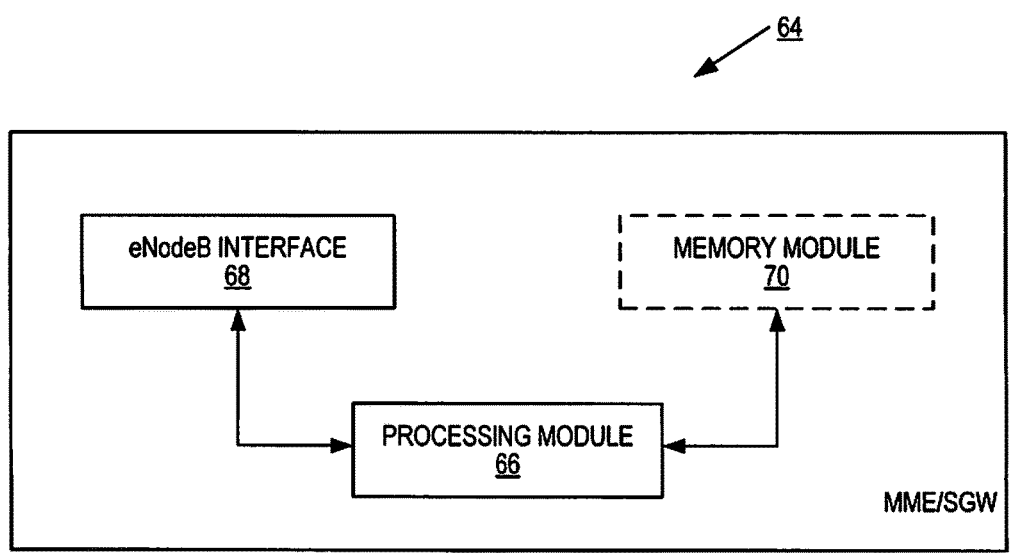
FIG. 13 is a block diagram of a core network node according to some embodiments of the present disclosure.

FIG. 13 is a block diagram of a core network node 64 according to some embodiments of the present disclosure. This discussion is equally applicable to the MME(s) 24 and the SGWs/PGWs 26. The core network node 64 comprises a processing module 66 that controls the operation of the core network node 64. The processing module 66 is coupled to components and/or circuitry (e.g., an eNodeB interface 68) for allowing the core network node 64 to exchange information with a network node (e.g., a base station 12) with which it is associated (which is typically via an S1 interface). The core network node 64 may also optionally comprise a memory module 70 that is coupled to the processing module 66 and that stores one or more programs and other information and data required for the operation of the core network node 64.

It will be appreciated that only the components of the wireless device 20, the network node 44, and the core network node 64 are required to explain the functionality of the embodiments presented herein, and are illustrated in FIGS. 9 through 13. While processes in the drawing figures may show a particular order of operations performed by certain embodiments, it should be understood that such order is only exemplary (e.g., alternative embodiments may perform the operations in a different order, combine certain operations, overlap certain operations, etc.).

While the disclosure has been described in terms of several embodiments, those skilled in the art will recognize that the disclosure is not limited to the embodiments described herein, and can be practiced with modifications and alterations within the spirit and scope of the appended claims. The description is thus to be regarded as illustrative instead of limiting.

The following acronyms are used throughout this disclosure.

3GPP Third Generation Partnership Project
ASIC Application Specific Integrated Circuit
BTS Base Transceiver Station
CA Carrier Aggregation
CC Component Carrier
CE Control Element
CPU Central Processing Unit
CRS Cell-Specific Reference Signal
CSI Channel State Information
CSI-RS Channel State Information Reference Signal
D2D Device-to-Device
DAS Distributed Antenna System
DRX Discontinuous Reception
EDGE Enhanced Data Rates for Global Evolution
eNB Enhanced or Evolved Node B
E-SMLC Evolved Serving Mobile Location Centre
FDD Frequency Division Duplexing
FPGA Field Programmable Gate Array
GERAN Global System for Mobile Communications Enhanced Data Rates for Global Evolution Radio Access Network
GPS Global Positioning System
GSM Global System for Mobile Communications
HSPA High Speed Packet Access
ID Identity or Identifier
LEE Laptop Embedded Equipment
LME Laptop Mounted Equipment
LTE Long Term Evolution
M2M Machine-to-Machine
MAC Medium Access Control
MDT Minimization of Drive Tests
MME Mobility Management Entity
ms Millisecond
MSC Mobile Switching Centre
MSR Multi-Standard Radio
MTC Machine-Type Communication
O&M Operation and Management
OSS Operations Support System
P2P Peer-to-Peer
PCC Primary Component Carrier
PCell Primary Cell
PDA Personal Digital Assistant
PGW Packet Data Network Gateway
PRS Positioning Reference Signal
PSC Primary Serving Cell
PSS Primary Synchronization Signal
QCL Quasi Co-Location
QoS Quality of Service
RAM Random Access Memory
RAN Radio Access Network
RAT Radio Access Technology
RLM Radio Link Monitoring
ROM Read Only Memory
RRC Radio Resource Control
RRH Remote Radio Head
RRM Radio Resource Management
RRU Remote Radio Unit
RSRQ Reference Signal Received Quality
RSRP Reference Signal Received Power
RSTD Reference Signal Time Difference
SCC Secondary Component Carrier
SCell Secondary Cell
SGW Serving Gateway
SON Self Organizing Network
SSC Secondary Serving Cell
SSS Secondary Synchronization Signal
TDD Time Division Duplexing
UE User Equipment
UTRAN Universal Terrestrial Radio Access Network
USB Universal Serial Bus
VOIP Voice Over Internet Protocol
VPN Virtual Private Network
WCDMA Wideband Code Division Multiple Access
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a cellular communications network for determining whether to perform one or more measurements on a carrier with a deactivated cell, comprising:
   acquiring, by the wireless device, at least one parameter related to a periodicity, $D_p$, of a discovery signal transmitted on one or more cells of the carrier with the deactivated cell, where deactivated means turned off;
   acquiring, by the wireless device, a measurement cycle parameter, $S_c$, for performing the one or more measurements on the one or more cells of the carrier;
   comparing, by the wireless device, the periodicity, $D_p$, of the discovery signal and the measurement cycle parameter, $S_c$;
   deciding, by the wireless device, to perform the one or more measurements on the one or more cells of the carrier only when at least one occasion of the discovery signal is time-aligned with at least one occasion of the measurement cycle parameter, $S_c$, as determined based on a starting time of the periodicity, $D_p$, of the discovery signal and the measurement cycle parameter, $S_c$; and performing, by the wireless device, the one or more measurements on the one or more cells of the carrier.

2. The method of claim 1, wherein the carrier is a secondary component carrier of a carrier aggregation system, and the method further comprises:
configuring, by the wireless device, the wireless device to operate with the secondary component carrier of the carrier aggregation system, wherein the deactivated cell is a deactivated secondary cell that operates on the secondary component carrier.

3. The method of claim 1, wherein acquiring the measurement cycle parameter, $S_c$, comprises:
receiving, by the wireless device, a request from a radio access node to perform the one or more measurements on the one or more cells of the carrier of the deactivated cell, the request comprising the measurement cycle parameter, $S_c$.

4. The method of claim 1, further comprising:
after deciding to perform the one or more measurements:
determining, by the wireless device, an actual measurement cycle parameter, $S_{c1}$, based on the comparison of the periodicity, $D_p$, of the discovery signal and the measurement cycle parameter, $S_c$; and
performing, by the wireless device, the one or more measurements in accordance with the actual measurement cycle parameter, $S_{c1}$.

5. The method of claim 4, further comprising:
reporting, by the wireless device, results of performing the one or more measurements to a node of the cellular communications network.

6. The method of claim 4, further comprising:
reporting, by the wireless device, the actual measurement cycle parameter, $S_{c1}$, to a node of the cellular communications network.

7. The method of claim 1, wherein acquiring the at least one parameter related to the periodicity, $D_p$, of the discovery signal comprises:
receiving, by the wireless device, the periodicity, $D_p$, of the discovery signal as a value transmitted by the cellular communications network.

8. The method of claim 7, wherein acquiring the at least one parameter related to the periodicity, $D_p$, of the discovery signal further comprises:
receiving, by the wireless device, an indication of a starting time of the periodicity, $D_p$, of the discovery signal from the cellular communications network.

9. The method of claim 1, wherein acquiring the at least one parameter related to the periodicity, $D_p$, of the discovery signal comprises:
acquiring, by the wireless device, at least one parameter having a known relationship to the periodicity, $D_p$, of the discovery signal; and
deriving, by the wireless device, the periodicity, $D_p$, of the discovery signal from the at least one parameter.

10. The method of claim 9, further comprising:
deriving, by the wireless device, a starting time for the periodicity, $D_p$, of the discovery signal from the at least one parameter.

11. The method of claim 9, wherein the at least one parameter is chosen from the group consisting of:

a bandwidth of the carrier;
a number of subframes within discovery signal occasion; and
an identifier associated with the discovery signal.

12. The method of claim 1, wherein determining an actual measurement cycle parameter, $S_{c1}$, comprises setting the actual measurement cycle parameter, $S_{c1}$, to a maximum of the periodicity, $D_p$, of the discovery signal and the measurement cycle parameter, $S_c$.

13. The method of claim 12, further comprising:
performing, by the wireless device, the one or more measurements in accordance with the actual measurement cycle parameter, $S_{c1}$, over a predefined time period corresponding to the measurement cycle parameter, $S_c$, multiplied by a scaling factor, m.

14. The method of claim 1, wherein determining an actual measurement cycle parameter, $S_{c1}$, comprises setting the actual measurement cycle parameter, $S_{c1}$, to the measurement cycle parameter, $S_c$, multiplied by an integer, k, greater than or equal to 1, when the measurement cycle parameter, $S_c$, is greater than or equal to the periodicity, $D_p$, of the discovery signal.

15. The method of claim 14, wherein determining the actual measurement cycle parameter, $S_{c1}$, further comprises setting the actual measurement cycle parameter, $S_{c1}$, to the periodicity, $D_p$, of the discovery signal multiplied by an integer, k, greater than or equal to 1, when the measurement cycle parameter, $S_c$, is less than the periodicity, $D_p$, of the discovery signal.

16. The method of claim 15, wherein performing the one or more measurements in accordance with the actual measurement cycle parameter, $S_{c1}$, comprises:
performing the one or more measurements in accordance with the actual measurement cycle parameter, $S_{c1}$, over a predefined time period corresponding to the measurement cycle parameter, $S_c$, multiplied by a scaling factor, m.

17. The method of claim 1, wherein the discovery signal is a first reference signal for a carrier with a deactivated cell, and the periodicity, $D_p$, of the discovery signal is less than a periodicity of a second reference signal for a cell in an activated state.

18. The method of claim 1, wherein the discovery signal comprises at least one of a Cell-Specific Reference Signal, CRS, a Channel State Information Reference Signal, CSI-RS, a Primary Synchronization Signal, PSS, a Secondary Synchronization Signal, SSS, and a Positioning Reference Signal, PRS.

19. The method of claim 1, wherein the carrier is one of an intra-frequency carrier, an inter-frequency carrier, and an inter-Radio Access Technology, RAT, carrier.

20. The method of claim 1, wherein the one or more measurements comprise at least one of the group consisting of: Radio Resource Management, RRM, measurements, Radio Link Monitoring, RLM, related measurements, Quasi Co-Location, QCL, of transmitting nodes, Reference Signal Time Difference, RSTD, Channel State Information, CSI, and time and frequency synchronization among transmissions of reference signals.

21. A wireless device in a cellular communications network operable for determining whether to perform one or more measurements on one or more cells of a carrier with a deactivated cell that operates on a component carrier, comprising:
a transceiver module;
a processing module; and a memory module storing software executable by the processing module, whereby the wireless device is operative to:

acquire at least one parameter related to a periodicity, $D_p$, of a discovery signal of the deactivated cell on the carrier, where deactivated means turned off;

acquire a measurement cycle parameter, Sp, for the one or more measurements on the one or more cells of the carrier;

compare the periodicity, $D_p$, of the discovery signal and the measurement cycle parameter, $S_c$;

decide to perform the one or more measurements on the one or more cells of the carrier only when at least one occasion of the discovery signal is time-aligned with at least one occasion of the measurement cycle parameter, $S_c$, as determined based on a starting time of the periodicity, $D_p$, of the discovery signal and the measurement cycle parameter, $S_c$; and perform the one or more measurements on the one or more cells of the carrier.

* * * * *